(12) United States Patent
Chang et al.

(10) Patent No.: US 6,233,075 B1
(45) Date of Patent: *May 15, 2001

(54) OPTICAL LAYER SURVIVABILITY AND SECURITY SYSTEM

(75) Inventors: Gee-Kung Chang, Holmdel, NJ (US); Georgios Ellinas, Long Island City, NY (US); Richard Graveman, Morristown; Clyde Monma, Bridgewater, both of NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/473,595

(22) Filed: Dec. 29, 1999

Related U.S. Application Data

(60) Provisional application No. 60/117,074, filed on Jan. 25, 1999.

(51) Int. Cl.⁷ ..................................................... H04J 14/02
(52) U.S. Cl. .......................... 359/124; 359/123; 370/392; 370/471
(58) Field of Search ..................................... 359/123–124, 359/135; 370/352, 355–356, 392, 471

(56) References Cited

U.S. PATENT DOCUMENTS

| | | | |
|---|---|---|---|
| 4,797,879 * | 1/1989 | Habbab et al. ........................ | 359/123 |
| 4,831,616 * | 5/1989 | Huber .................................... | 359/137 |
| 5,101,290 * | 3/1992 | Eng et al. .............................. | 359/123 |
| 5,550,818 * | 8/1996 | Brackett et al. ...................... | 370/395 |
| 5,589,967 * | 12/1996 | Auffret .................................. | 359/123 |
| 5,734,486 * | 3/1998 | Guillemot et al. ................... | 359/139 |
| 5,912,753 * | 6/1999 | Cotter et al. ......................... | 359/137 |

OTHER PUBLICATIONS

J. Lee, et al., "Secure Communications Using Chaos," IEEE Global Telecommunications Conference –Singapore, 1995, pp. 1183–1187.

D. Drake, et al., "Pseudo–Chaos for Direct–Sequence Spread–Spectrum Communication," SPIE –The International Society for Optical Engineering, 1995, Vol. 2612, pp. 104–114.

C. Bennett, et al., "Experimental Quantum Cryptography," Journal of Cryptology, vol. 5, No. 3, 1992, pp. 3–28.

* cited by examiner

*Primary Examiner*—Kinfe-Michael Negash
(74) *Attorney, Agent, or Firm*—Joseph Giordano

(57) ABSTRACT

An optical signaling header technique applicable to optical networks wherein packet routing information is embedded in the same channel or wavelength as the data payload so that both the header and data payload propagate through network elements with the same path and the associated delays. The technique effects survivability and security of the optical networks by encompassing conventional electronic security with an optical security layer by generating replicated versions of the input data payload at the input node, and the transmission of each of the replicated versions over a corresponding one of the plurality of links. Moreover, each of the links is composed of multiple wavelengths to propagate optical signals or optical packets, and each of the replicated versions of the data payload may be propagated over a selected one of the wavelengths in each corresponding one of the plurality of links.

38 Claims, 20 Drawing Sheets

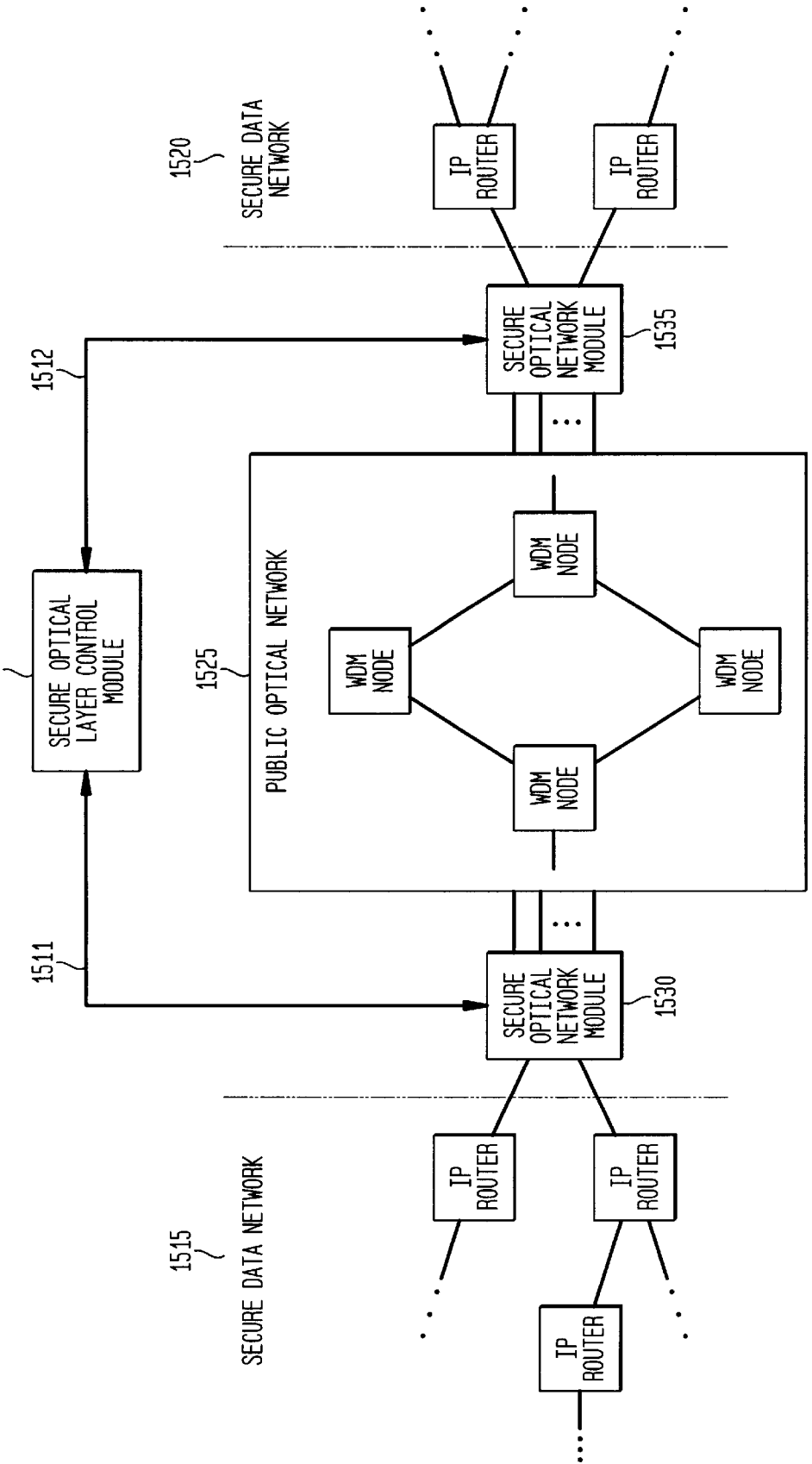

OPTICAL LAYER SURVIVABILITY AND SECURITY SYSTEM

CROSS-REFERENCE TO RELATED APPLICATION

This application is a non-provisional application of provisional application Ser. No. 60/117,074 filed Jan. 25, 1999.

BACKGROUND OF THE DISCLOSURE

1. Field of the Invention

This invention relates generally to optical communication systems and, more particularly, to a secure and survivable optical system, characterized by high throughput and low latency network traffic, which deploys an optical signaling header propagating with the data payload to convey security and survival information.

2. Description of the Background

Recent research advances in optical Wavelength Division Multiplexing (WDM) technology have fostered the development of networks that are orders of magnitude higher in transmission bandwidth and lower in latency than existing commercial networks. While the increase in throughput and the decrease in latency are impressive, it is also necessary to ensure secure and survivable propagation in order to realize the Next Generation Internet (NGI) vision of providing the next generation of ultra-high speed networks that can meet the requirements for supporting new applications, including national initiatives. Towards this end, current research efforts have focused on developing an ultra-low latency Internet Protocol (IP) over WDM optical packet switching technology that promises to deliver the three-fold goal of high throughput, low latency, as well as secure and survivable networks. Such efforts, while promising, have yet to fully realize this three-fold goal. The problems to be mitigated with a secure and survivable network are set forth in the following description.

A. Possible "Attack" Methods

New forms of Optical Layer Survivability and Security (OLSAS) are essential to counter signal misdirection, eavesdropping (signal interception), and denial of service (including jamming) attacks that can be applied to currently deployed and future optical networks. The signal misdirection scenario can be thought of as a consequence of an enemy taking control of a network element or a signaling (control) channel. Possible optical eavesdropping (signal interception) methods can include (i) non-destructive fiber tapping, (ii) client layer tapping, and (iii) non-linear mixing. (Destructive fiber tapping is also a possibility, but this scheme is readily detectable by monitoring power on individual channels.) A description of each of these methods is now summarized:

(i) Non-destructive fiber tapping can be the result of: (a) fiber bending resulting in 1–10% of the optical signal (all wavelengths if a WDM system are used) being emitted out of the fiber cladding and being gathered and amplified by an eavesdropper; (b) fiber-side fusion involving stripping the fiber cladding and fusing two fiber cores together as another way to perform signal interception (note that this is an extremely difficult technique to implement); (c) acousto-optic diffraction involving placing acousto-optic devices on the fiber, which results in the leakage of 1–10% of the optical signal (all wavelengths) outside the fiber cladding. There are three examples of non-destructive fiber tapping, as follows:

(ii) Client layer tapping is the result of measuring the non-zero residuals of other channels by the switches of the multiplexers/demultiplexers. When the signal goes through the optical switches, part of the optical signal that is not dropped at the client layer will appear at the client interface. Even though this signal will have very low power levels, in many instances it can result in recognizable information.

(iii) Non-linear mixing involves sending a high-power pump wave to achieve, for example, four-wave-mixing and in turn map all channels to different wavelengths that are monitored by a malicious user. This technique requires phase matching at dispersion zero wavelength on the fiber.

Finally, denial of service can be the result of a variety of attacks. Some of these attacks include using a high-intensity saturating source, a UV bleach, or a frequency chirped source to jam the optical signal.

B. Comparison With Other Approaches

The three approaches that are currently used to perform encryption of the electronic data in the optical layer are the following: (i) chaotic optical encryption; (ii) quantum optical encryption; and (iii) optical spread spectrum encryption. All three schemes can be used underneath the electronic encryption layer to protect the information from possible attacks.

(i) Chaotic Optical Encryption

The chaotic optical encryption technique uses what is called "chaotic systems" as the optical encryption method. These are single wavelength chaotic synchronous fiber lasing systems that use amplitude or frequency modulation to introduce a "chaotic state" in the network. The information transmitted through the network is encoded onto chaos at the transmitter side and decoded at the receiver side. This is accomplished by using a synchronized "chaotic state" at the receiving end in order to "de-encrypt" the original optical signal. Communications method using chaotic lasers have been demonstrated, with representative references being: (1) C. Lee, J. Lee, D. Williams, "Secure Communications Using Chaos", Globecom 1995; and (2) D. Drake, D. Williams, "Pseudo-chaos for Direct-Sequence Spread Spectrum Communications", SPIE, Photonics East, Philadelphia, 1995. The schemes utilized a relatively small message embedded in the larger chaotic carrier that is transmitted to a receiver system where the message is recovered from the chaos. The chaotic optical source and receiver are nearly identical, so that the two chaotic behaviors can synchronize. There are a number of shortcomings for this method, which the technique in accordance with the present invention overcomes.

First, the chaotic behaviors are highly susceptible to changes in the initial conditions. The probability for the receiving end chaotic laser to synchronize its chaotic behavior gets much smaller as the initial conditions wander. For instance, if the two chaotic lasers drift in their relative cavity length due to changes in the ambient, the probability of synchronization drops very rapidly. Hence, multiple receiving users must all synchronize the path length of their lasers. The situation becomes more complex for WDM networks deployed in the field, since cross-modulations in polarization, phase, and amplitude between multiple channels are bound to alter the initial conditions seen by the receiving users. In fact, nonlinear optical effects such as self-phase-modulation will even alter the spectrum of the chaotic carrier. It is difficult to expect such synchronization to be successfull for every packet in multiwavelength optical networks. Previously it has been shown with optical network elements equipped with clamped erbium-doped fiber amplifiers (EDFAs) and Channel Power Equalizers (CPEs), lasing in the closed cycles does affect transport characteristics of other wavelength channels, even if it does not saturate the EDFAs. Chaotic oscillations in a transparent optical network due to lasing effect in a closed cycle have been observed. They are attributed to the operation of multiple channel power equalizers within the optical ring. The presence of unstable ring lasers can cause power penalties to other wavelength channels through EDFA gain fluctuation, even though these EDFAs are gain clamped. It has also been found that the closed cycle lasing does not saturate the gain clamped EDFAs in the cycle because the lasing power is regulated by the CPEs. This observation and analysis have significant impacts on the design and operation of network elements in transparent WDM networks.

Second, the noise and the chaotic behaviors are highly frequency dependent. Such a chaotic method, even if it works well for one particular data format, cannot work well for a wide range of data formats.

Third, the accommodation of chaotic optical carrier is made at the expense of useful signal bandwidth, network coverage, and network capacity. To enhance the probability of synchronization, the chaotic optical carrier must possess reasonably high optical power and consequently sacrifices the power available for the data. A simple signal-to-noise argument leads us to the conclusion that the network capacity and network reach will significantly drop due to excessive power in the chaotic carrier.

Fourth, the network must agree on a fixed configuration of the chaotic lasers for both transmitters and receivers. Once the eavesdropper acquires or learns this information, the entire network will be open to this eavesdropper. The method in accordance with the present invention, on the other hand, can vary the security coding from packet to packet for every wavelength channel.

(ii) Quantum Optical Encryption

The second method applies optical encryption at the quantum level by using the state of photons (e.g., polarization of the photons) to detect a security breach. The main idea behind this approach is the encoding of the information in a string of randomly chosen states of single photons. Anyone trying to eavesdrop by tapping part of the light must perform a measurement on the quantum state, thus modifying the state of the light. This modification of the state of the photons can then be used to detect a security breach. Representative references pertaining to this subject matter are: (1) C. Bennett, G. Brassard, A. Ekert, "Quantum Cryptography", Scientific American, 1992; and (2) C. Bennett, F. Bessette, G. Brassard, L. Salvail, J. Smolin, "Experimental Quantum Cryptography", Journal of Cryptology, Vol. 5, No. 3, 1992. One of the fundamental problems of this technique is that it is slow (data rates of only a few Mb/sec can be accommodated) and it can only be applied to communications that span short distances (a few Km). Furthermore, when the optical signal travels relatively long distances, the polarization of the photons may change (even if polarization dispersion fiber is used). This will generate a false alarm. Finally, another problem that arises is whether an attack (security breach) may be carried out that will be undetectable to the parties involved in the secure communication (i.e., the polarization of the photons does not change when an eavesdropper taps part of the light).

(iii) Spread Spectrum Techniques in Optical Domain

The third approach uses the spread spectrum technique to distribute the information packets to a number of different wavelengths. The section that follows tries to identify how this new technique compares to the classical spread spectrum techniques that are currently being used to provide security in mobile systems. Spread spectrum communication was originated 60 years ago; the main purpose then was to protect military communication signals against jamming. In that scheme, frequency hopping and frequency agile multiple access (FDMA) techniques were employed. Later on, CDMA (code-division multiple access) and SDMA (space-division multiple access) were developed to enhance the communication channel capacity and performance.

The CDMA method can increase the channel capacity by almost 10-fold over other access methods, but it is sensitive to both terrestrial signal interference and the noise added in-band by the simultaneous presence of multiple users. Thus, transmitter power control and forward error control (FEC) adjustment is very crucial to the performance of CDMA systems. These systems operate with low bit error rate (BER) ($10^{-3}$ is a typical number) and low data rates (on the order of Kbps).

The inventive OLSAS mechanism combines all three approaches employed in the RF domain, namely, frequency hopping and frequency division multiple access (FDMA), CDMA, and SDMA. Rather than increasing the system access capacity at the expense of adding noise in the signal band, a different view of the performance and bandwidth/capacity management in dense WDM optical networks is taken. The abundant bandwidth provided by the WDM optical cross-connects with more wavelengths (e.g., 128) at higher bit rates (10 Gb/s) is traded for each fiber port.

SUMMARY OF THE INVENTION

These and other shortcomings and limitations of the prior art are obviated, in accordance with the present invention, by a methodology and concomitant circuitry for propagating an input data payload received from a source over an optical network to effect survivability and security, the optical network including optical nodes and optical links interconnecting the nodes, one of the nodes serving as an input node with the input node being coupled to a plurality of the links for propagation. can be propagated over a selected one of the wavelengths composing the corresponding one of the links. Broadly, with this method aspect of the invention, the following steps are carried out to propagate a data payload from an input network element to an output network element over a wavelength division multiplexing network composed of a plurality of network elements and links interconnecting the network elements, the data payload having a given format and protocol: (a) generating and storing a local routing table in each of the network elements, each local routing table determining alternative local routes through the associated one of the network elements and the corresponding links; (b) generating and storing replicated versions of the data payload in the input network element; (c) adding an optical header to each of the replicated versions of the data payload to produce a plurality of corresponding packets, the header having a format and protocol and being indicative of the local route through each of the network elements for each of the packets, the format and protocol of the data payload being independent of the format and protocol of the header; (d) transmitting each of the packets over a corresponding one of the links; (e) detecting the header of each of the packets at the network elements as each of the packets propagates through the WDM network; (f) selecting one of the local routes for routing each of the packets through each of the network elements by looking up the header in the corresponding local routing table; and (g) routing each of the packets to the output network element through the network elements in correspondence to the selected route.

Features of the inventive subject matter in accordance with the present invention are now elucidated.

The optical-label (or optical-tag) switched packet has a header and a data payload, and the inventive OLSAS method writes optical layer security features to the header of each packet. Thus, eavesdroppers must attempt to break into the encryption for each and every packet independently. The optical header holds the security features such as the "key" information for decrypting the spectrum spread and packet sequencing numbers. It is difficult to break into this underlying scheme on a packet by packet basis. In addition, the code-division-multiple access nature of this security measure also makes this method relatively immune to the jamming attempt by the enemy—the wavelength jamming will affect packet survivability scheme only if such jamming signals fortuitously match the layers of security coding. The inventive encryption method is practically guaranteed to work so long as the optical label-switched packets are transported with required integrity. The authorized network users can decrypt each packet with the authorized network access key and a synchronized Secure Pseudo-Random Number Generator (SPRNG) workstation in both transmitter and receiver pair.

The OLSAS mechanism based on Dense WDM (DWDM) optical-label switching offers a number of advantages over other methods such as conventional security measures and methods using synchronized chaotic links. The conventional encryption method implemented on a single (wavelength) channel is susceptible to an eavesdropper who has acquired the decryption key. In such cases, the eavesdropper can continue to decrypt all incoming data until caught or the key is changed. Changing keys dynamically is even more difficult, since the sender must announce such changes by a different, secure means. However, by adding secure key distribution and synchronization, significant advantages are obtained. First, it is possible to integrate strong cryptographic authentication along with key distribution as a basis for data integrity. Second, the chosen secret-sharing mechanisms can be varied rapidly and unpredictably in ways that make the adversary's task more complex. Because a single fiber may carry 128 different wavelengths, and a message may be split across an arbitrary number of these wavelengths, there exists a combinatorial explosion of keys indicating how a message is being transmitted and protected at any time, even if only a single fiber is considered. The inventive method can achieve secure communications by assigning packets onto randomly selected different wavelengths on packet-by-packet bases.

Authorized network users possess the network access key, which allows them to decrypt the signaling header for the packets coming in from the authorized sender. The decrypted signaling header possesses the information on the key for decrypting the data payload of the packet. This takes place for every packet with the information on the key varying from packet to packet.

Another difference lies in the fact that conventional security schemes, in practice, work only for fixed data formats and protocols. The inventive OLSAS method is based on the optical label switching, whereby the optical header and the data payload can have completely different formats and protocols. Hence it is possible to vary the data format and protocol, thus making the task more difficult for eavesdroppers or intruders.

BRIEF DESCRIPTION OF THE DRAWINGS

The teachings of the present invention can be readily understood by considering the following detailed description in conjunction with the accompanying drawings, in which:

FIG. 15 depicts a high-level block diagram of the optical network, the SOLC module, and the way the SOLC module sends synchronizing information to the secure optical network modules;

To facilitate understanding, identical reference numerals have been used, where possible, to designate identical elements that are common to the figures.

DETAILED DESCRIPTION

Overview of Optical Layer Survivability And Security (OLSAS) System

The techniques in accordance with the illustrative embodiments set forth in detail below provide various levels of protection against all three of the optical "attack" schemes described in the Background Section, as well as against other attack scenarios. By taking advantage of the existence of (a) multiple optical wavelengths and (b) diverse network paths, it is possible to transmit information in a manner that both increases network survivability and bolsters information integrity while mitigating the effects of eavesdropping, misdirection, and denial of service attacks. For instance, distributing information from a particular session across a (randomly selected) set of wavelengths (i.e., a subset of all possible wavelengths available on a link or in the network) can defend against non-destructive fiber tapping by an adversary or signal misdirection due to enemy takeover of a network node or a control channel. Furthermore, multiple paths allow for greater tolerance against denial of service attacks, such as jamming.

Also, it is important to note that the OLSAS techniques are complementary to existing or future security and survivability mechanisms within the electronic domain. These OLSAS techniques are not intended as a substitute for the vast array of security and encryption mechanisms currently available. Rather, they seek to enhance the electronic security mechanisms by offering an extra level of security within the optical (physical) layer using the strength of optical switching and multiplexing techniques.

Figure 1:
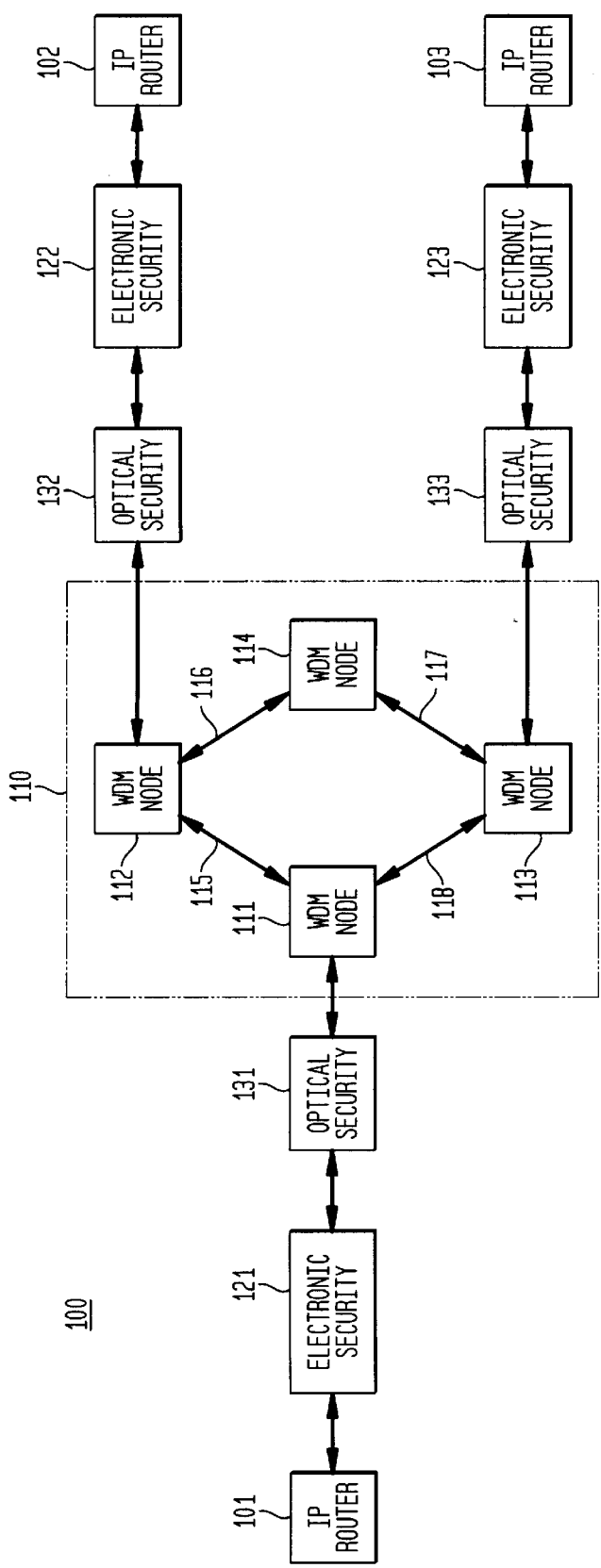
FIG. 1 depicts a high-level block diagram of the location of optical link security devices in the backbone network in accordance with the present invention.

A pictorial view of this two-tier security approach is shown in FIG. 1 wherein system 100 in high-level block diagram form includes: (a) optical network backbone "cloud" 110 having WDM nodes 111, . . . , 114 coupled by optical paths 115, . . . , 118, as depicted; (b) IP routers 101, 102, and 103 served by network backbone 110; (c) end-to-end electronic security devices 121, 122, and 123, each coupled to a respective IP router at its output; and (d) optical link security devices 131, 132 and 133, each respectively interposed between a corresponding electronic security device and network backbone 110. The view of FIG. 1 clearly illustrates the complementary nature of the electronic and optical security devices.

The OLSAS system has been devised to carry out information flow protection based on network and security features in the optical header, which is carried in-band within an individual wavelength and modulated out-of-band in the frequency domain. IP packets contained in each information flow are transported over at least two copies of several randomly selected wavelength channels via choices of multiple disjoint paths. Thus, "flows" or "streams" of data can be survivable based on these OLSAS techniques.

Figure 2:
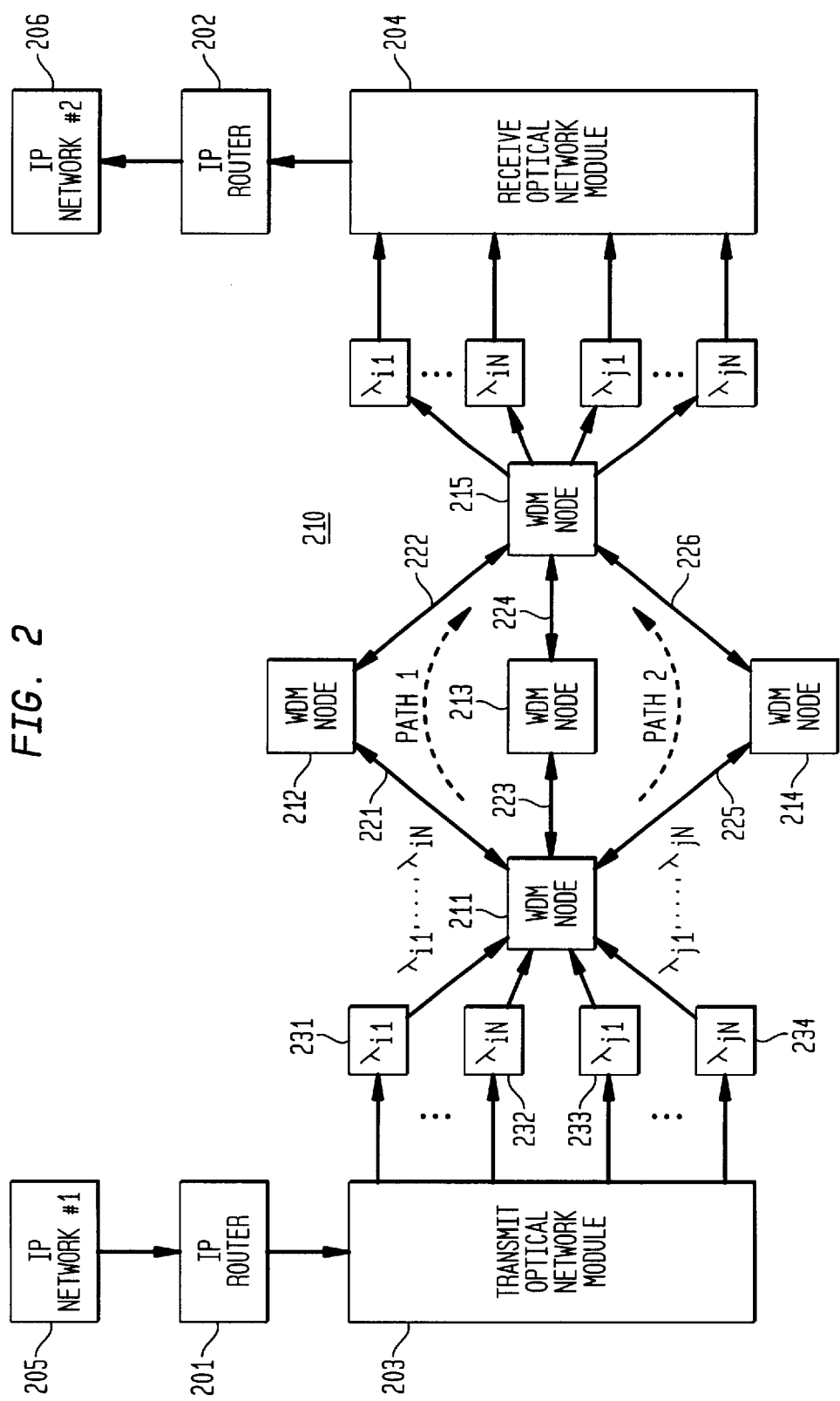
FIG. 2 shows an illustrative embodiment for transmitting packets over disjoint paths and over a subset of wavelengths.

FIG. 2 below illustrates one embodiment of the OLSAS technique. IP packets from source IP Network #1 205 enter WDM backbone network 210 via IP router 201 and are destined for IP Network #2 206 via IP router 202. WDM network 210 is composed of WDM nodes 211, . . . , 215 coupled by the links/edges as shown, namely, nodes 211 and 212 are coupled by link 221, node 212 and node 215 are coupled by link 222, and so forth. The packets emitted by router 201 are processed in the Transmit Optical Network Module (ONM) 203 interposed between router 201 and network 210; in ONM 203 the electronic packets are converted to equivalent optical IP packets with an associated optical header. In addition, the ONM 203 applies the OLSAS technique (using, for example, a secure pseudo-random number generator (SPRNG) as discussed in more detail later) to choose multiple paths through the WDM network, each of which carries a cryptographic share of the packets in a particular IP session. In the example of FIG. 2, there are two disjoint paths, Path 1 (composed of, in series, node 211, link 221, node 212, link 222, and node 215), and Path 2 (composed of, in series, node 211, link 225, node 214, link 226, and node 215). For each of Path 1 and Path 2, ONM 203 assigns a (same or different) pseudo-random subset of available wavelengths on which to transmit the "shares", that is, a collection of packets, from a particular session. In FIG. 2, wavelengths $\lambda_{i1}, \ldots, \lambda_{iN}$ having reference numerals 231, . . . , 232 define a first subset of wavelengths for propagation over Path 1, whereas wavelengths $\lambda_{j1}, \ldots, \lambda_{jN}$ having reference numerals 233, . . . , 234 define a second subset of wavelengths for propagation over Path 2. One possible arrangement is to propagate packet 1 using $\lambda_{i1}$ and packet N using $\lambda_{iN}$ of Path 1; concurrently, packet 1 is transmitted using $\lambda_{j1}$ and packet N using $\lambda_{jN}$ of Path 2. The selection of multiple paths and wavelengths is varied at regular time intervals at a rate depending on the desired levels of survivability and security. The IP packet shares conveying the data payload are never examined or modified, thus preserving transparency and independence of the higher levels of the protocol stack.

At the far end, the IP packet shares are received by Receiver ONM 204, converted back to electronic packets, and handed over to IP router 202 associated with IP Network #2.

ONMs 203 and 204 are synchronized and, as alluded to, use any robust Secure Pseudo-Random Number Generator (SPRNG) to coordinate the pseudo-random assignment of paths and wavelengths for a particular IP session. Cryptographically SPRNGs are necessary to construct the shares of the secrets and check the vectors described above. These generators produce output bits indistinguishable from truly random sources to any resource-bounded adversary. This implies that if one is presented with an output bit string from which any single bit is deleted, one cannot guess the missing bit with measurably better probability than 0.5. Since integrity or secrecy is based upon splitting a message among the wavelengths on a fiber, it may be necessary for maximum security to disguise the contents of the remaining unused wavelengths to make them indistinguishable from the live data. This will require a rather large supply of cryptographically strong pseudo-random bits. All of the coordination between source ONM 203 and destination ONM 204 is through the optical headers of the packets and does not rely on the underlying IP session, packets, applications, or particular data items.

The approach of FIG. 2 is representative of one exemplary approach to effect secure transmissions which deploys two or more disjoint paths to carry information between different end systems. Another variation on the general approach is to not duplicate the information on the number of disjointed paths, but rather only a portion of the information is sent on each path. Even if the information on one path is tapped, and even if it is possible to calculate the subset of wavelengths used to carry that information, it is impossible to capture all the information being sent. The advantage of this variation is that an adversary needs to tap multiple paths and calculate the different subset of wavelengths in each such path in order to obtain the information being sent. Clearly, this variation becomes more effective when the number of disjoint optical paths increase. At the receiver side in this arrangement a number of paths are combined to obtain the original information being sent.

The method of securing a message by splitting it into shares or components is called secret sharing, that is, sharing splits information into multiple parts or shares. Some subsets of the shares are sufficient to reconstruct the secret information, but smaller subsets are insufficient. The so-called threshold schemes have the desirable property that insufficient subsets reveal no partial information about what is being protected, so they are called perfect. Perfect secret sharing of messages can provide secrecy with respect to passive adversaries and survivability with respect to network failures.

Typically with secret sharing, if one of the shares is corrupted, the wrong value will be reconstructed. Therefore, verifiable secret sharing has become an important extension of secret sharing providing integrity with respect to active adversaries capable of tampering. Verifiable secret sharing allows corrupted shares to be identified and removed. To accomplish this, simple checksums of all the shares can be distributed with each of the shares so any "honest majority" can always pinpoint the corrupted shares.

Figure 3A:
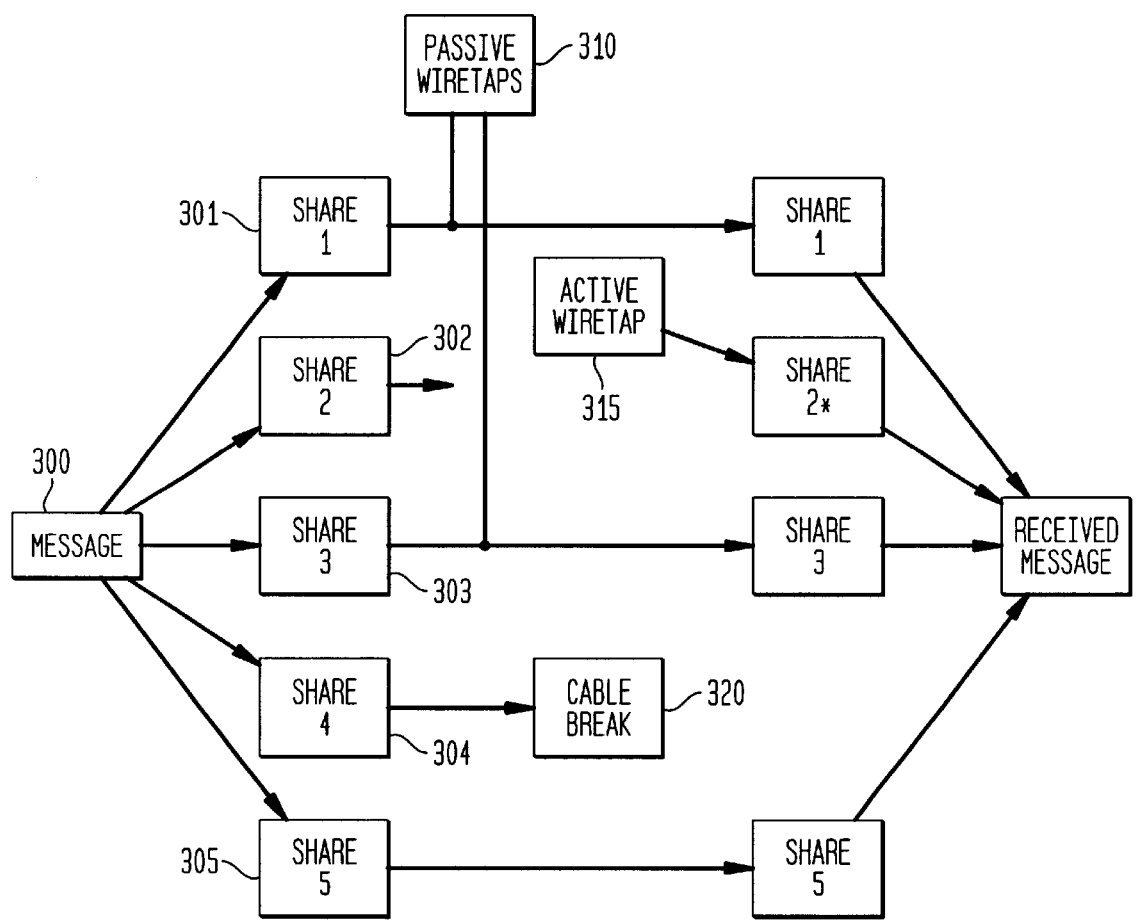
FIGS. 3A and 3B show illustrative embodiments for transmitting a subset of packets over disjoint paths without submitting all the packets of a session over a single path.

The block diagram of FIG. 3A illustrates this mechanism. In this example, message 300 is split into Share 1, Share 2, . . . , Share 5 (reference numerals 301–305, respectively) whereby any three of which may be used to reconstruct message 300. Shares 1, 3, and 5 are received intact, which is sufficient to reconstruct message 300. An eavesdropper (reference numeral 310) may get shares 1 and 3, but two shares alone reveal nothing about message 300. Share 2, impacted by active wiretap 315, produces Share 2* which is identified as an imposter and rejected by the majority (Shares 1, 3, and 5), whereas Share 4 never arrives at all due to a cable break shown by reference numeral 320.

Figure 3B:
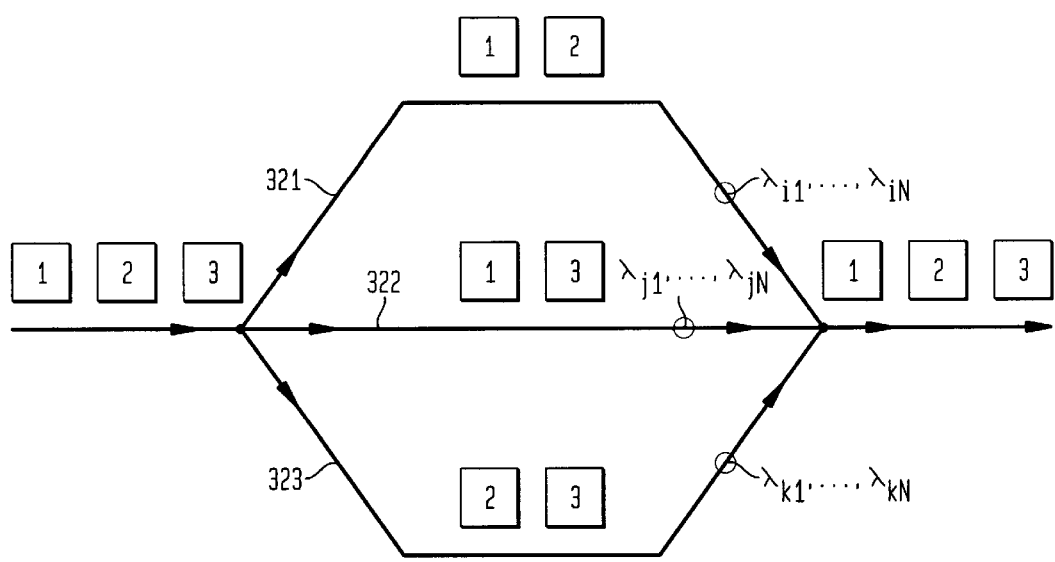

FIG. 3B shows in pictorial fashion another example using three disjoint paths, namely, paths 321, 322, and 323. On each path, two-thirds of the information is being sent (two out of three packets), a first packet on a first wavelength and a second packet on a second wavelength. If an adversary taps one path, and is able to calculate the appropriate subset of wavelengths being used, the adversary can only obtain two-thirds of the information being sent. At the receiver side, two paths are sufficient to obtain all the information.

Illustrative Embodiments
Illustrative Network for Deploying OLSAS Techniques

The OLSAS methodology is engendered by a technique called WDM optical label-switching—defined as the dynamic generation and determination of a routing path for a burst duration by an in-band optical signaling header. Data packets are routed through the WDM network using an in-band WDM signaling header for each packet. At a switching node, the signaling header is processed and the header and the data payload (1) may be immediately forwarded through an already existing flow state connection (to be discussed), or (2) a path can be setup for a burst duration to handle the header and the data payload. WDM label-switching enables highly efficient routing and throughput, and reduces the number of IP-level hops required by keeping the packets routing at the optical level to one hop as managed by the Network Control and Management (NC&M) which creates and maintains routing information.

It is instructive then to first discuss the general WDM network upon which the OLSAS technique is overlaid, before discussing the details of OLSAS method. This approach serves to introduce terminology useful for the description of the OLSAS overlay, as well as providing a heuristic motivation as to the purpose of the OLSAS techniques.

Figure 4:
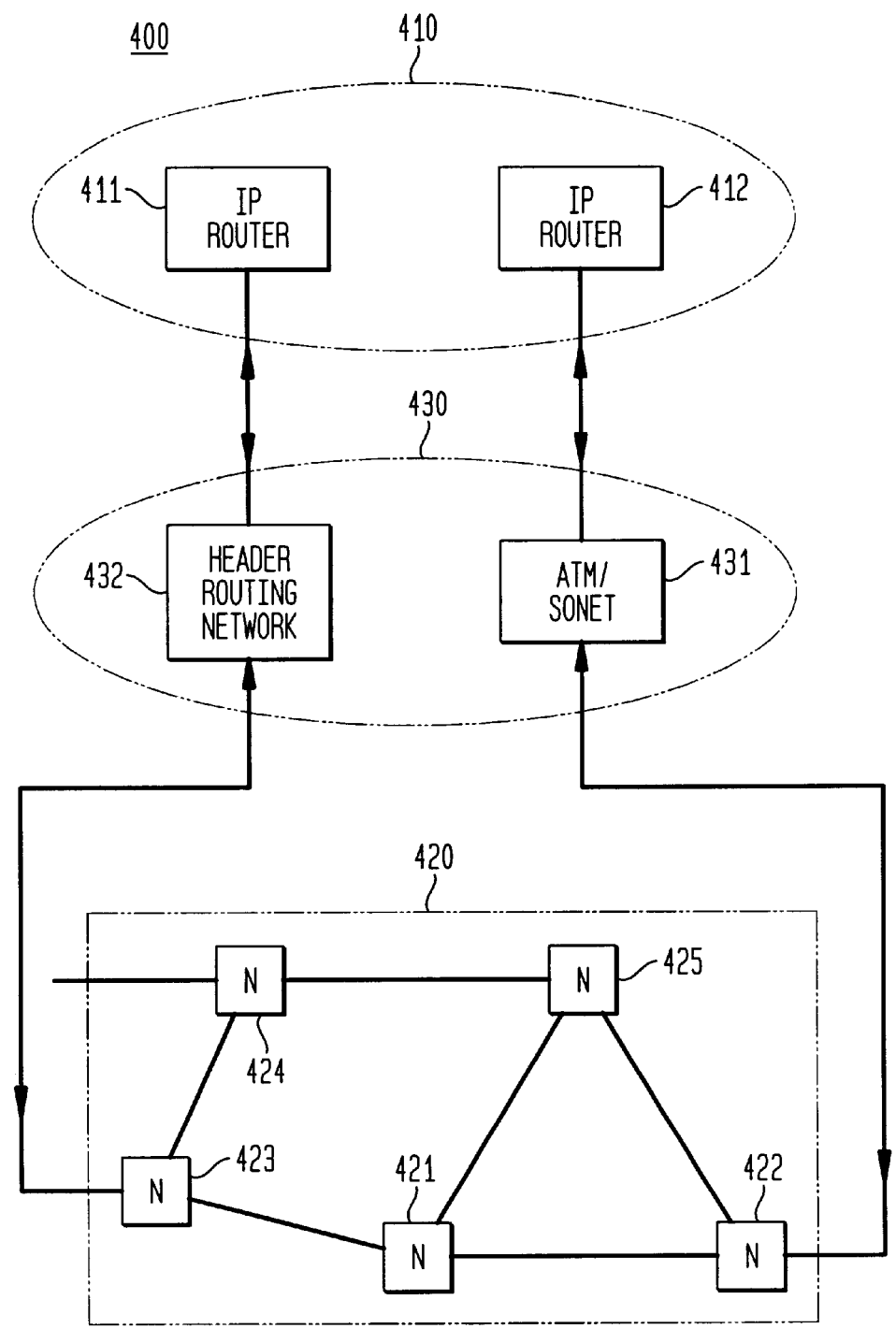
FIG. 4 is a pictorial representation of a general network illustrating the coupling between the optical and network layers of the network.

The depiction of FIG. 4 shows the inter-relation between optical layer 420 and electrical layer 410 of generic network 400 as provided by intermediate layer 430 coupling the optical layer and the electrical layer. Electrical layer 410 is shown, for simplicity, as being composed of two conventional IP routers 411 and 412. Optical layer 420 is shown as being composed of network elements or nodes 421–425. Intermediate layer 430 depicts conventional ATM/SONET system 431 coupling IP router 412 to network element 422. Also shown as part of layer 430 is header routing network 432 (the function of which is to be discussed in connection with the present invention) which couples IP router 411 to network element 423. FIG. 4 pictorially illustrates the location of network 432 on a national-scale, transparent WDM-based backbone network with full interoperability and reconfigurability. It is important to emphasize at this point that the elements of FIG. 4 are illustrative of one embodiment; thus, for example, element 411 may, in another embodiment, be an ATM router or even a switch.

Figure 5:
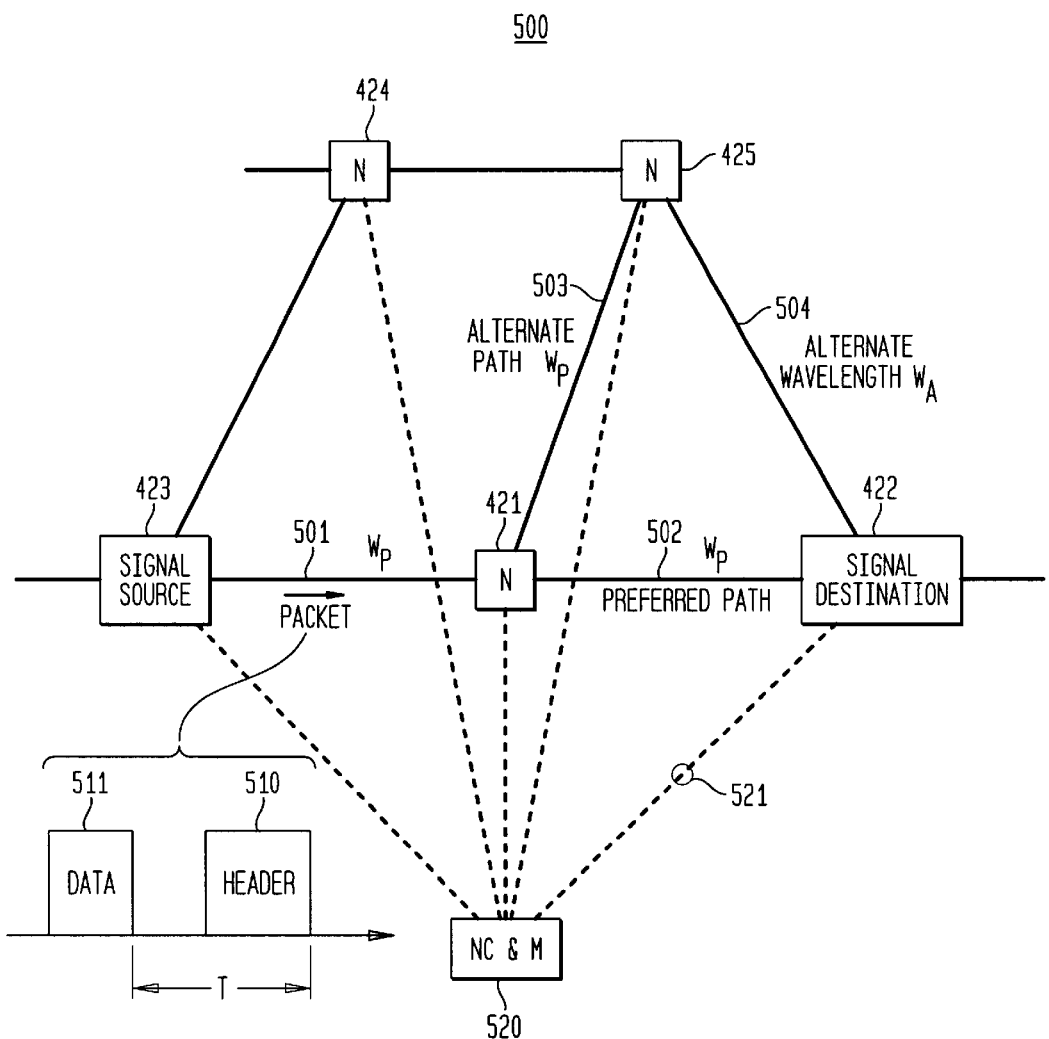
FIG. 5 illustrates the optical layer of FIG. 4 showing the relationship between the optical signal header and data payload, and the use of the header/payload in network setup.

Now with reference to FIG. 5, optical layer 420 of FIG. 4 is shown in more detail including the basic technique for setting up a fast connection in optical network 500, composed of network elements 421–425; the setup uses optical signaling header 510 for the accompanying data payload 511. This technique combines the advantages of circuit-switched based WDM and packet-switched based IP technologies. New signaling information is added in the form of an optical signal header 510, which is carried in-band within each wavelength in the multi-wavelength transport environment. Optical signaling header 510 is a label containing routing and control information such as the source, destination, priority, and the length of the packet, and propagates through optical network 500 preceding data payload 511. Each WDM network element 421–425 senses optical signaling header 510, looks-up a connection table (discussed later), and takes necessary steps such as cross-connections, add, drop, or drop-and-continue. The connection table is constantly updated by continuous communication between NC&M 520 and WDM network elements 421–425 through logical connections, such as channel 521. Data payload 511, which follows optical signaling header 510, is routed through a path in each network element (discussed later) as established by the connection. With the arrangement of FIG. 5, there is no need to manage the time delay between optical signaling header 510 and data payload 511, shown by T in FIG. 5, because each network element provides the optical delay needed for the short time required for connection set-up within each network element via delay of an interposed fiber. Moreover, the format and protocol of the data payload is independent of that of the header, that is, for a given network whereas the format and protocol of the header are predetermined, the format and the protocol of the data payload can be the same as or different from those of the header.

Each destination is associated with a preferred path which minimizes 'the cost'—in FIG. 5, the overall preferred path from source 423 to destination 422 includes paths 501 and 502 in cascade, both utilizing wavelength Wp. This cost is computed based on the total propagation distance, the number of hops, and the traffic load. The preferred wavelength is defaulted to the original wavelength. For example, the preferred wavelength on path 502 is Wp. If this preferred path at the default wavelength is already occupied by another packet, then network element 421 quickly decides if there is an available alternate wavelength Wa through the same preferred path. This alternate wavelength must be one of the choices offered by the limited wavelength conversion in network element 421. If there is no choice of wavelengths which allows transport of the packet through the most preferred path, the next preferred path is selected (path deflection). For example, in FIG. 5, paths 503 and 504 in cascade may represent the alternative path. At this point, the preferred wavelength will default back to the original wavelength Wp. The identical process of looking for an alternate wavelength can proceed if this default wavelength is again already occupied. In FIG. 5, path 503 is an alternative path with the same wavelength Wp, and path 504 is an alternate path using alternate wavelength Wa. In an unlikely case where there is no combination of path and wavelength deflection that can offer transport of the packet, network element 421 will decide to drop the packet of lower priority. In other words, the new packet transport through the preferred path at the originating wavelength takes place by dropping the other packet of the lower priority which is already occupying the preferred path.

Network elements 421–425 are augmented with two types of so-called 'Plug-and-Play' modules to efficiently handle bursty traffic by providing packet switching capabilities to conventional circuit-switched WDM network elements 421–425 whereby signaling headers are encoded onto IP packets and are removed when necessary.

Figure 6:
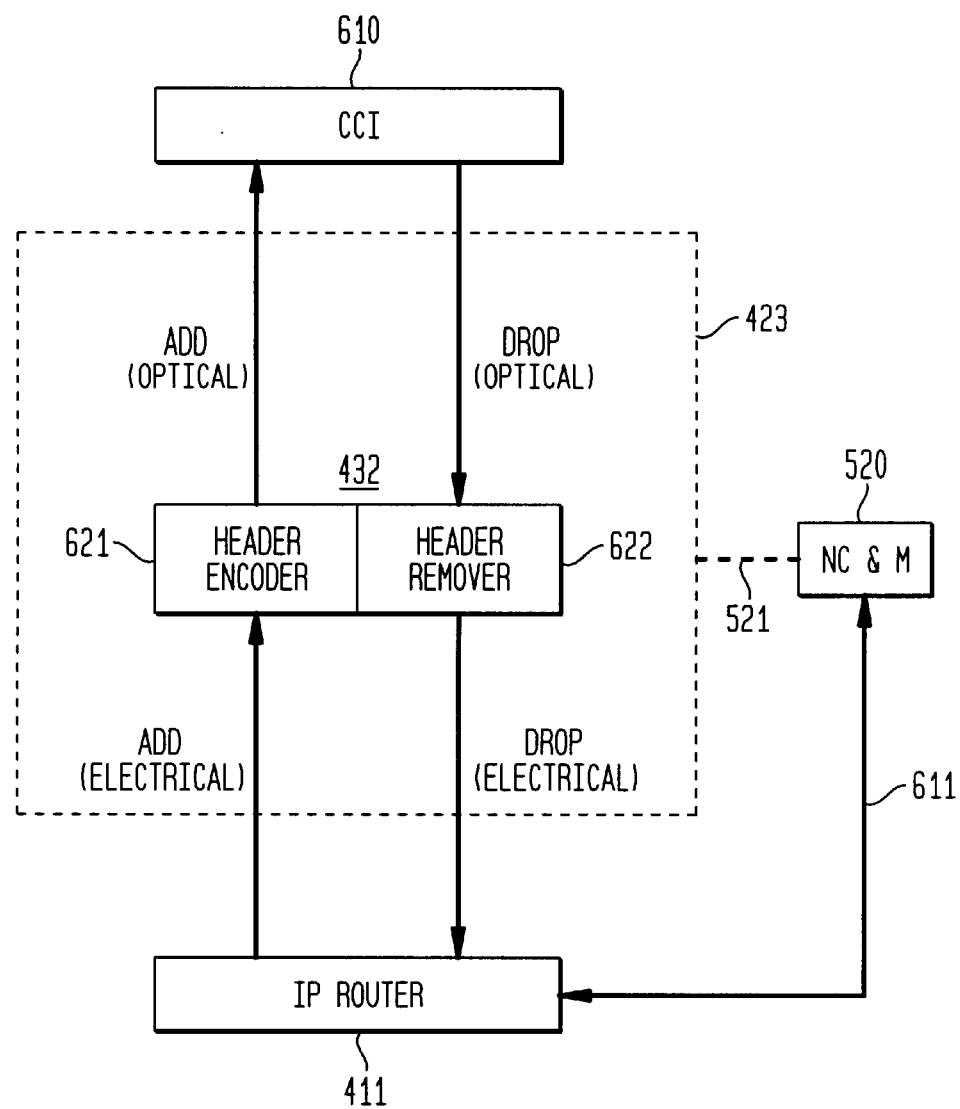
FIG. 6 depicts a high-level block diagram of an input node which effects header encoding and removing.

The first type of 'Plug-and-Play' module, represented by electro-optical element 432 of FIG. 4, is now shown in block diagram form in FIG. 6. Whereas conceptually module 432 is a stand-alone element, in practice, module 432 is integrated with network element 423 as is shown in FIG. 6; module 432 is interposed between compliant client interface (CCI) 610 of network element 423 and IP router 411 to encode optical signaling header 510 onto the packets added into the network via header encoder 621, and to remove optical signaling header 510 from the packets dropping out of the network via header remover 622.

Generally, encoding/removing module 432 is placed where the IP traffic is interfaced into and out of the WDM network, which is between the client interface of the network element and the IP routers. The client interfaces can be either a CCI-type or a non-compliant client interface (NCI)-type. At these interfaces, header encoder 621 puts optical header 510 carrying the destination and other information in front of data payload 511 as the IP signal is transported into network 501. Optical header 510 is based on the IP signal's original IP address, which is obtained from IP router 411 through interface 611, and is encoded in the optical domain by an optical modulator. Signaling header remover 622 deletes header 510 from the optical signal dropped via a client interface, and provides an electrical IP packet to IP router 411.

More specifically, module 432 accepts the electrical signal from IP router 411, converts the electrical signal to a desired compliant wavelength optical signal, and places optical header 510 in front of the entire packet. Module 432 communicates with NC&M 520 and buffers the data before optically converting the data if requested by NC&M 520. Module 432 employs an optical transmitter with the wavelength matched to the client interface wavelength.

Figure 7:
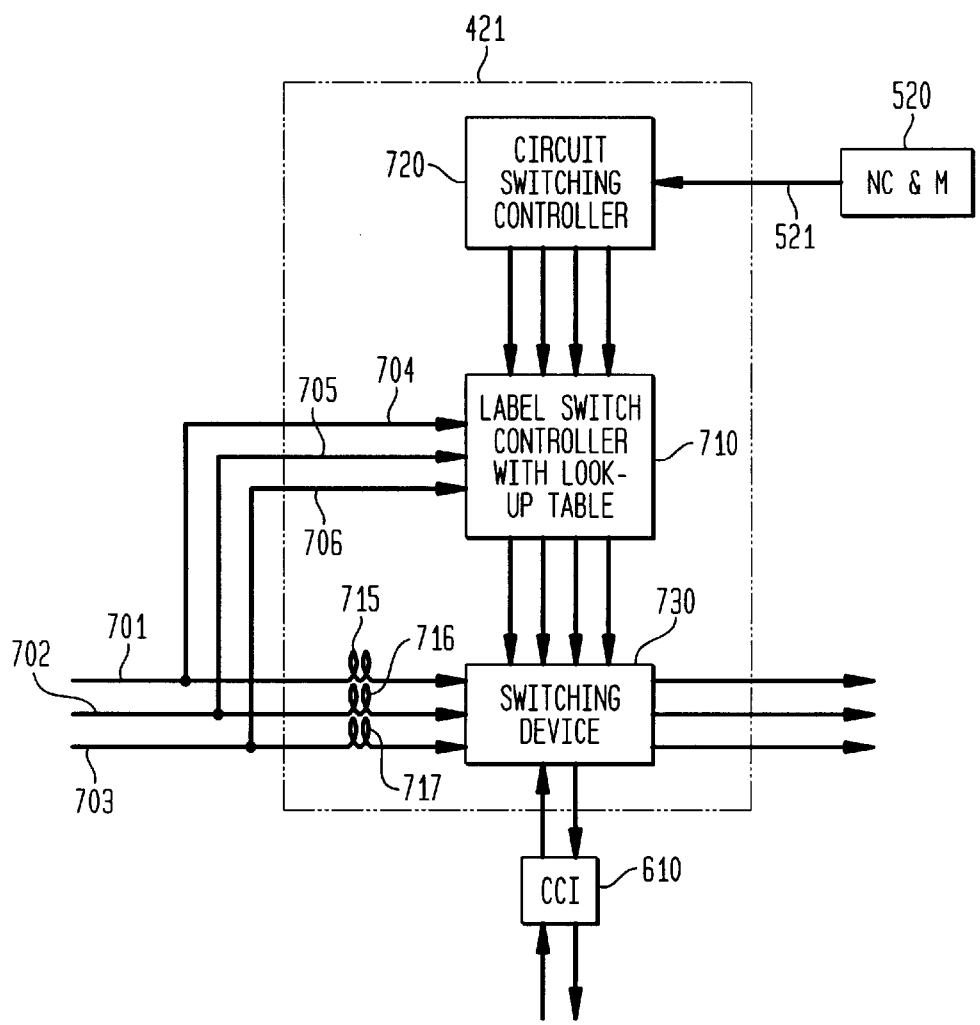
FIG. 7 depicts a high-level block diagram of control applied to an optical switch as engendered by label switching.

FIG. 7 depicts a second type of 'Plug-and-Play' module, optical element 710, which is associated with each WDM network element 421–425, say element 421 for discussion purposes. Module 710 is interposed between conventional network element circuit switch controller 720 and conventional switching device 730. Module 710 detects information from each signaling header 510 propagating over any fiber 701–703, as provided to module 710 by tapped fiber paths 704–706. Module 710 functions to achieve very rapid table look-up and fast signaling to switching device 730. Switch controller 720 is functionally equivalent to the conventional "craft interface" used for controlling the network elements; however, in this case, the purpose of this switch controller 720 is to accept the circuit-switched signaling from NC&M 520 and determine which control commands are to be sent to label switch controller 710 based on the priority. Thus, label switch controller 710 receives circuit-switched control signals from network element circuit switch controller 720, as well as information as derived from each signaling header 510, and intelligently chooses between the circuit-switched and the label-switched control schemes. The switches comprising switching device 730 also achieve rapid switching. The delay imposed by fibers 715, 716, or 717, which are placed in input paths 701–703 to switching device 730, are such that the delay is larger than the total time it takes to read signaling header 510, to complete a table look-up, and to effect switching. Approximately, a 2 km fiber provides 10 microsecond processing time. The types of WDM network elements represented by elements 421–425 and which encompass switching device 730 include: Wavelength Add-Drop Multiplexers (WADMs); Wavelength Selective Crossconnects (WSXCs); and Wavelength Interchanging Crossconnects (WIXCs) with wavelength conversion capabilities.

In operation, module 710 taps a small fraction of the optical signals appearing on paths 701–703 in order to detect information in each signaling header 510, and determine the appropriate commands for switching device 730 after looking up the connection table stored in module 710. The fiber delay is placed in paths 701–703 so that the packet having header 510 and payload 511 reaches switching device 730 only after the actual switching occurs. This fiber delay is specific to the delay associated with header detection, table look-up, and switching, and can typically be accomplished in about 10 microseconds with about 2 km fiber delay in fibers 715–717.

Packets are routed through network 500 using the information in signaling header 510 of each packet. When a packet arrives at a network element, signaling header 510 is read and either the packet (a) is routed to a new appropriate outbound port chosen according to the label routing look-up table, or (b) is immediately forwarded through an already existing label-switching originated connection within the network element. The latter case is referred to as "flow switching" and is supported as part of optical label-switching; flow switching is used for large volume bursty mode traffic.

Label-switched routing look-up tables are included in network elements 421–425 in order to rapidly route the optical packet through the network element whenever a flow switching state is not set-up. The connection set-up request conveyed by optical signaling header 510 is rapidly compared against the label-switch routing look-up table within each network element. In some cases, the optimal connections for the most efficient signal routing may already be occupied. The possible connection look up table is also configured to already provide an alternate wavelength assignment or an alternate path to route the signal. Providing at least one alternative wavelength significantly reduces the blocking probability. The alternative wavelength routing also achieves the same propagation delay and number of hops as the optimal case, and eliminates the difficulties in sequencing multiple packets. The alternate path routing can potentially increase the delay and the number of hops, and the signal-to noise-ratio of the packets are optically monitored to eliminate any possibility of packets being routed through a large number of hops. In the case where a second path or wavelength is not available, contention at an outbound link can be settled on a first-come, first-serve basis or on a priority basis. The information is presented to a regular IP router and then is reviewed by higher layer protocols, using retransmission when necessary.

Routing Example

Figure 8:
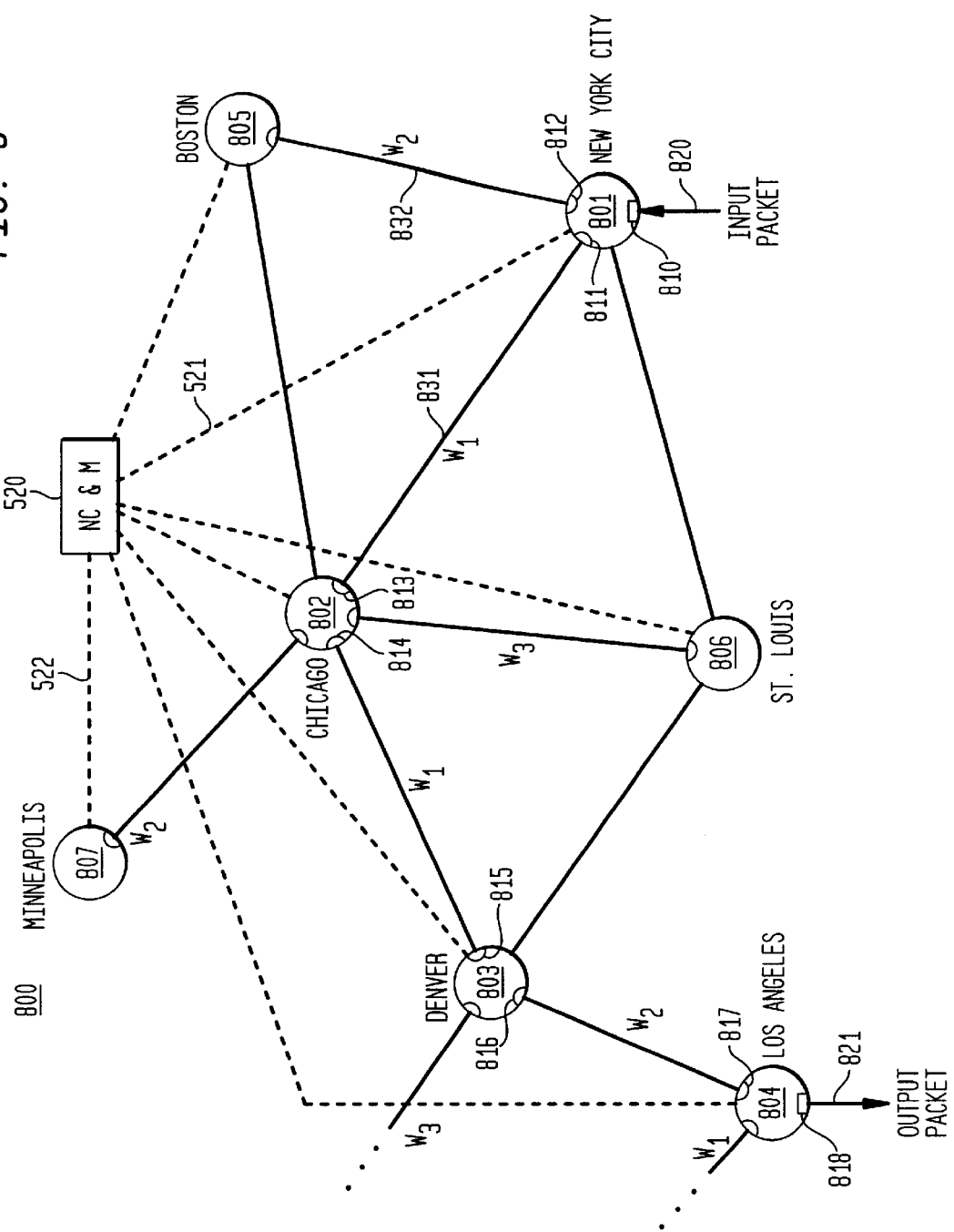
FIG. 8 is illustrative an a WDM circuit-switched backbone network.

An illustrative WDM circuit-switched backbone network 800 for communicating packets among end-users in certain large cities in the United States is shown in pictorial form in FIG. 8—network 800 is first discussed in terms of its conventional operation, that is, before the overlay the elements and methodology in accordance with the present invention is presented.

With reference to FIG. 8, it is supposed that New York City is served by network element 801, Chicago is served by network element 802, . . . , Los Angeles is served by network element 804, . . . , and Minneapolis by network element 807. (Network elements may also be referred to as nodes in the sequel.) Moreover, NC&M 520 has logical connections (shown by dashed lines, such as channel 521 to network element 801 and channel 522 to network element 807) to all network elements 801–807 via physical layer optical supervisory channels; there is continuous communication among NC&M 520 and network elements 801–807. NC&M 520 periodically requests and receives information about: (a) the general state of each network element (e.g., whether it is operational or shut down for an emergency); (b) the optical wavelengths provided by each network element (e.g., network element 801 is shown as being served by optical fiber medium 831 having wavelength W1 and optical fiber medium 832 having wavelength W2 which connect to network elements 802 (Chicago) and 805 (Boston), respectively); and (c) the ports which are served by the wavelengths (e.g., port 810 of element 801 is associated with an incoming client interface conveying packet 820, port 811 is associated with W1 and port 812 is associated with W2, whereas port 813 of element 802 is associated with W1).

Thus, NC&M 520 has stored at any instant the global information necessary to formulate routes to carry the incoming packet traffic by the network elements. Accordingly, periodically NC&M 520 determines the routing information in the form of, for example, global routing tables, and downloads the global routing tables to each of the elements using supervisory channels 521, 522, . . . The global routing tables configure the ports of the network elements to create certain communication links. For example, NC&M 520 may determine, based upon traffic demand and statistics, that a fiber optic link from New York City to Los Angeles (network elements 801 and 804, respectively) is presently required, and the link will be composed, in series, of: W1 coupling port 811 of element 801 to port 813 in network element 802; W1 coupling port 814 of element 802 to port 815 of element 803; and W2 coupling port 816 of element 803 to port 817 of element 804. Then, input packet 820 incoming to network element 801 (New York City) and having a destination of network element 804 (Los Angeles) is immediately routed over this established link. At network element 804, the propagated packet is delivered as output packet 821 via client interface port 818.

In a similar manner, a dedicated path between elements 806 and 807 (St. Louis and Minneapolis, respectively) is shown as established using W3 between network elements 806 and 802, and W2 between elements 802 and 807.

Links generated in this manner—as based upon the global routing tables—are characterized by their rigidity, that is, it takes several seconds for NC&M 520 to determine the connections to establish the links, to download the connectivity information for the links, and establish the input and output ports for each network element. Each link has characteristics of a circuit-switched connection, that is, it is basically a permanent connection or a dedicated path or "pipe" for long intervals, and only NC&M 520 can tear down and re-establish a link in normal operation. The benefit of such a dedicated path is that traffic having an origin and a destination, which maps into an already-established dedicated path, can be immediately routed without the need for any set-up. On the other hand, the dedicated path can be, and most often is, inefficient in the sense that the dedicated path may be only used a small percentage of the time (e.g., 20%–50% over the set-up period). Moreover, switching device 730 (see FIG. 7), embedded in each network element that interconnects input and output ports, has only a finite number of input/output ports. If the above scenario is changed so that link from St. Louis to Minneapolis is required and a port already assigned to the New York to Los Angeles link is to be used (e.g., port 814 of network element 802), then there is a time delay until NC&M 520 can respond and alter the global routing tables accordingly.

Now the example is expanded so that "label-switching" is overlaid on the above description. First, a parameter called the "label-switched state" is introduced and its use in routing is discussed; then, in the next paragraph, the manner of generating the label-switch state is elucidated. The label-switch state engenders optical label switching.

Figure 9:
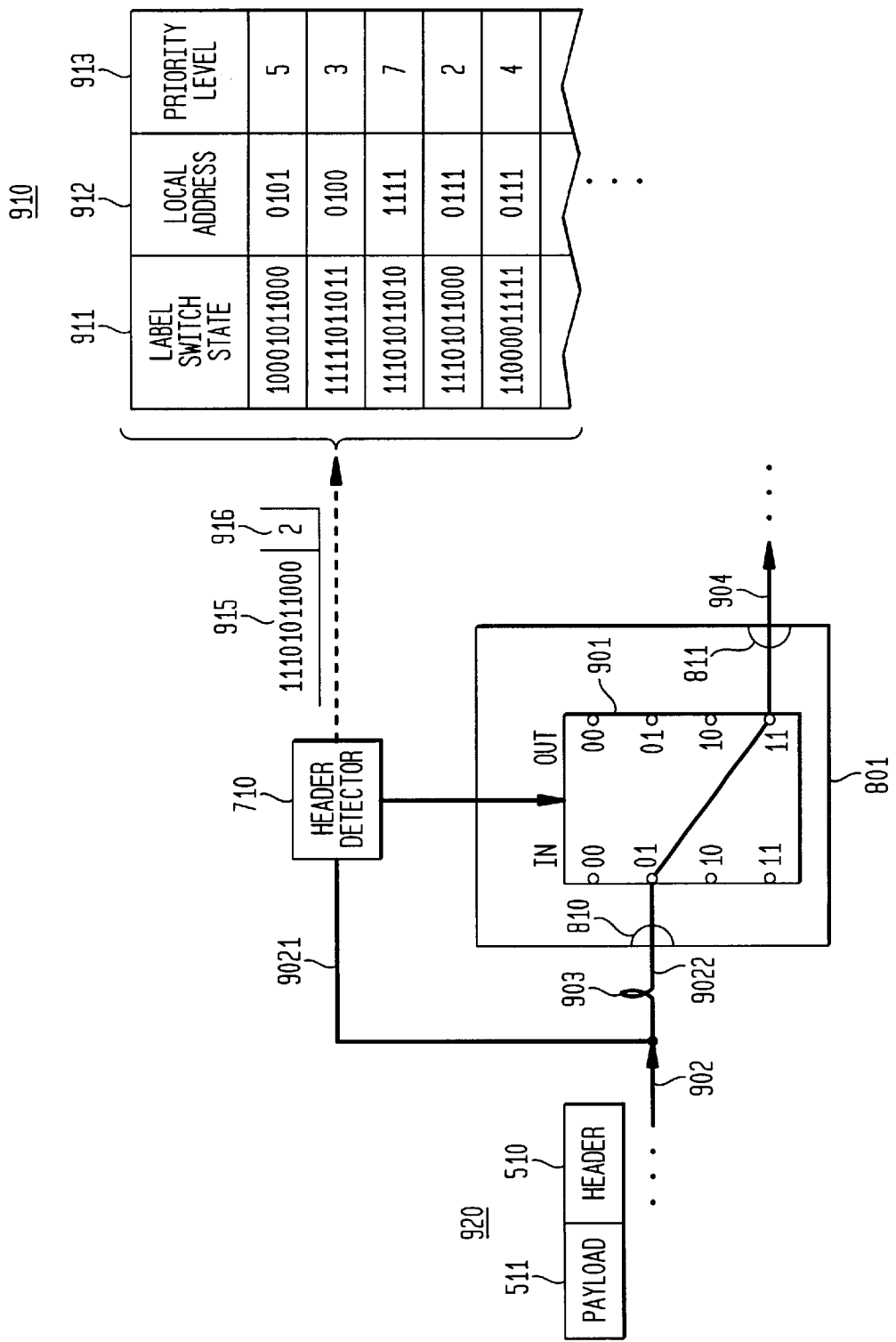
FIG. 9 depicts a block diagram of an illustrative embodiment of a header detector circuit, an optical switch, and the forwarding table residing in the label switch controller.

NC&M 520 is further arranged so that it may assign the label-switch state to each packet incoming to a network element from a client interface—the label-switch state is appended by Plug & Play module 432 and, for the purposes of the present discussion, the label-switch state is commensurate with header 510 (see FIG. 5). The label-switch state is computed by NC&M 520 and downloaded to each network element 801–807 in the form of a local routing table. With reference to FIG. 9, there is shown network element 801 and its embedded switch 901 in pictorial form. Also shown is incoming optical fiber 902, with delay loop 903, carrying packet 920 composed of header 510 and payload 511—payload 511 in this case is packet 820 from FIG. 8. Fiber 9022 delivers a delayed version of packet 920 to network element 801. Also, a portion of the light energy appearing on fiber 902 is tapped via fiber 9021 and inputted to optical module 710 which processes the incoming packet 920 to detect header 510—header 510 for packet 920 is shown as being composed of the label-switch state '11101011000', identified by reference numeral 915. Also shown in FIG. 9 is local look-up table 910, being composed of three columns, namely, "Label-switch State" (column 911), "Local Address" (column 912), and "Priority Level" (column 913). The particular label-switch state for packet 920 is cross-referenced in look-up table 910 to determine the routing of the incoming packet. In this case, the label-switch state for packet 920 is the entry in the fourth row of look-up table 910. The local switch address ("Local Address of column 911) corresponding to this label-switch state is "0111", which is interpreted as follows: the first two binary digits indicate the incoming port, and the second two binary digits indicate the output port. In this case, for the exemplary four-input, four-output switch, the incoming packet is to be routed from input port "01" to output port "11", so switch 901 is switched accordingly (as shown). After the delay provided by fiber delay 903, the incoming packet on fiber 9022 is propagated onto fiber 904 via switch 901.

The foregoing description of label-switch state indicates how it is used. The manner of generating the label-switch state is now considered. NC&M 520, again on a periodic basis, compiles a set of local look-up tables for routing/switching the packet through each corresponding network element (such as table 910 for network element 801), and each look-up table is then downloaded to the corresponding network element. The generation of each look-up table takes into account NC&M 520's global knowledge of the network 800. For instance, if incoming packet 820 to network element 801 is destined for network element 804 (again, New York to Los Angeles), if port 810 is associated with incoming port "01" and serves fiber 902, and if outgoing port 811 is associated with outgoing port "11" and serves fiber 904, then NC&M 520 is able to generate the appropriate entry in look-up table 910 (namely, the fourth row) and download table 910 to network element 801. Now, when packet 820 is processed by electro-optical module 432 so as to add header 510 to packet 820 to create augmented packet 920, NC&M 520's knowledge of the downloaded local routing tables as well as the knowledge of the destination address embedded in packet 820 as obtained via module 432 enables NC&M 520 to instruct module 432 to add the appropriate label-switch state as header 510—in this case '11101011000'.

It can be readily appreciated that processing a packet using the label-switch state parameter is bursty in nature, that is, after switch 801 is set-up to handle the incoming label-switch state, switch 801 may be returned to its state prior to process the flow state. For example, switch 801 may have interconnected input port '01' to output port '10' prior to the arrival of packet 920, and it may be returned to the '0110' state after processing (as determined, for example, by a packet trailer). Of course, it may be that the circuit-switched path is identical to the label-switch state path, in which case there is no need to even modify the local route through switch 801 for processing the label-switch state. However, if it is necessary to temporarily alter switch 801, the underlying circuit-switched traffic, if any, can be re-routed or re-sent.

As discussed so far, label switching allows destination oriented routing of packets without a need for the network elements to examine the entire data packets. New signaling information—the label—is added in the form of optical signal header 510 which is carried in-band within each wavelength in the multi-wavelength transport environment. This label switching normally occurs on a packet-by-packet basis. Typically, however, a large number of packets will be sequentially transported towards the same destination. This is especially true for bursty data where a large block of data is segmented in many packets for transport. In such cases, it is inefficient for each particular network element to carefully examine each label and decide on the routing path. Rather, it is more effective to set up a "virtual circuit" from the source to the destination. Header 510 of each packet will only inform continuation or ending of the virtual circuit, referred to as a flow state connection. Such an end-to-end flow state path is established, and the plug-and-play modules in the network elements will not disrupt such flow state connections until disconnection is needed. The disconnection will take place if such a sequence of packets have come to an end or another packet of much higher priority requests disruption of this flow state connection.

The priority aspect of the packet is also shown with respect to FIG. 9. The local look-up table has a "priority level" (column 913) which sets forth the priority assigned to the label-switching state. Also, header 510 has appended priority data shown as the number '2' (reference numeral 916). Both the fourth and fifth row in the "label-switch state" column 911 of table 910 have a local address of '0111.' If an earlier data packet used the entry in the fifth row to establish, for example, a virtual circuit or flow switching state, and the now another packet is processed as per the fourth row of column 911, the higher priority data ('2' versus '4', with '1' being the highest) has precedent, and the virtual circuit would be terminated.

Optical Networking Modules (ONMs) In Accordance With the OLSAS Method

Three optical networking modules are used to implement the Optical Layer Survivability And Security system. The first of the OLSAS modules is deployed at each of the multi-wavelength transport interfaces (e.g. at the multi-transport interfaces of node 421 of FIG. 4), the second OLSAS module (e.g., ONM 203 of FIG. 2) is deployed at the transmitter end of each single wavelength client interface (e.g. at the transmitter end of each single-client interface of node 423 of FIG. 4), and the third module (e.g., ONM 204 of FIG. 2) is deployed at the receiver side of each single wavelength client interface (e.g., a the receiver side of each single-client interface of node 422 of FIG. 4).

Transport Interface Optical Network Module

The first of the optical networking modules as located at the transport interfaces is, structurally, basically the same as the second type Plug-and-Play module discussed earlier—especially with respect to FIG. 9. It is recalled from the discussion of FIG. 9 that the second type of Plug-and-Play module is responsible for the optical-label switching function. When the header and the data payload (e.g., 510 and 511 of FIG. 9) reaches a transport node (e.g., node 801 of FIG. 9), a small percentage (e.g., 10 per cent) of the optical signal is tapped off (via optical line 9021) while the remaining portion of the signal is delayed in an optical delay line (e.g., line 903). For the part of the signal that is tapped off, the optical header is stripped from the optical signal in header detector (e.g. 710 of FIG. 9) and detected via conventional electrical circuitry composing the header detector. The optical header carries the optical label (e.g., 915), which in turn enables the packet to be routed appropriately through the switch (e.g., 901).

The variation of the methodology in accordance with the present invention is such that header/payload combination arriving over each wavelength in a subset of wavelengths at the second type of Plug-and-Play module may not necessarily be independent and distinct. As discussed with respect to FIG. 2, for example, wavelengths $\lambda_{i1}$ and $\lambda_{iN}$ arriving on link 221 to node 212 carry packets from a given IP session. However, the second type of Plug-and-Play module does not concern itself with this relation and therefore processes each incoming packet independently of any other packet, that is, the operation of the Plug-and-Play module is unaffected by the relation among packets.

Optical Network Module 203

The transmitter side of the single wavelength client interface deploys the second type of module—Optical Network Module 203. Module 203, in effect, either replaces or is arranged to augment the first type of Pug-and-Play module 432 to effect, broadly, the following procedure: (a) generate and store multiple optical copies of the input packets in an input transport node; and (b) optically transmit each of the multiple optical copies over a corresponding one of the links attached to the input transport node. In an illustrative embodiment, such steps may be further characterized by the steps of (i) generating multiple copies (at least 2) of the data packets so as to send the information destined for downstream transmission via at least two link-and-node disjoint paths—multiple copies can be achieved by using an IP packet multiplier known in the art; (ii) buffering the IP packets and using a SPRNG subsystem to "scramble" the packets and emit the scrambled packets from the buffer using M multiple output ports; and (iii) randomly assigning each of the output ports a wavelength again using a SPRGN subsystem. With this procedure, each path is assigned a different subset of M wavelengths out of the total number of existing wavelengths in the network.

Figure 10:
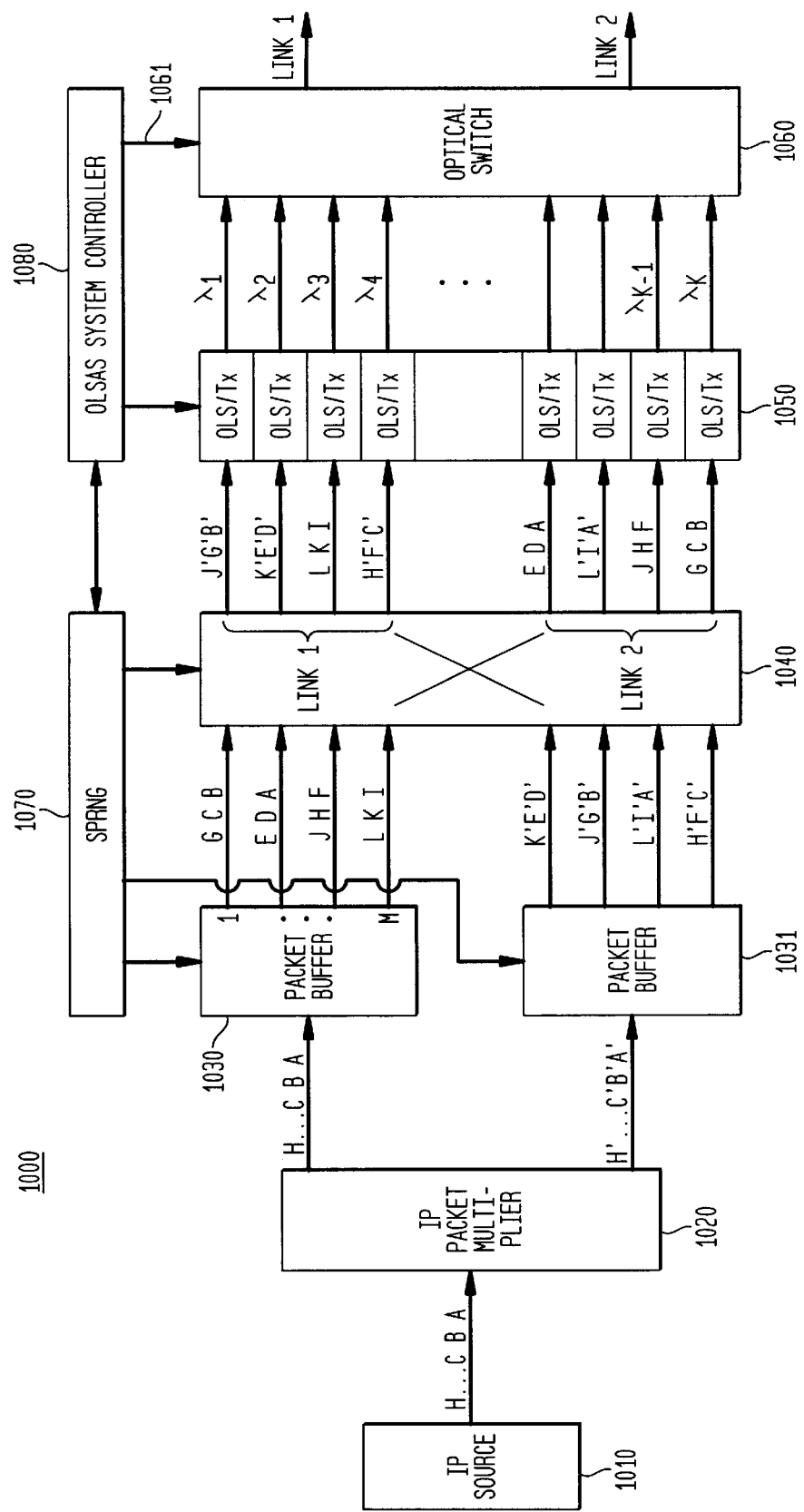
FIG. 10 is a high-level block diagram of the transmit optical network module in accordance with the present invention.

With reference to FIG. 10, there is shown illustrative arrangement 1000 which is one embodiment of ONM 203. Packet source 1010 (such as IP element 411 of FIG. 4) provides a packet stream depicted by A,B,C, . . . ,H to IP packet multiplier 1020.

The outputs of packet multiplier 1020 are two identical streams denoted A,B,C, . . . ,H and A', B', C', . . . H'. The first stream serves as an input to packet buffer 1030, whereas the second stream is an input to buffer 1031. Secure pseudo-random number generator 1070 provides "scrambling" information to each packet buffer to produce, in this example, four output streams per packet buffer. In particular, packet buffer 1030 outputs (ordered in time) a first stream B,C,G, a second stream A,D,E, a third stream F,H,J, and a fourth stream I,K,L. Similarly, packet buffer 1031 outputs four scrambled streams distinct from the output streams from buffer 1030. This aspect of scrambling ensures that all the packet information will not be duplicated on an individual optical wavelength at the output of arrangement 1000.

Next, SPRNG 1070 operates to rearrange the packet streams so that the streams from packet buffers 1030 and 1031 may be spread, in this case, across two optical links. In particular, SPRNG 1070 controls electronic cross-connect 1040 to produce four output streams, namely: B',G',J'; D',E',K'; I,K,L; and C',F',H' at the Link 1 output of cross-connect 1040. Similarly, four re-arranged streams are assembled for transmission over Link 2 emanating from cross-connect 1040. Each set of four streams serves as input to Optical Label Switching Transmitter (OLS/TX) 1050 which optically modulates packet stream B',G',J', along with the appropriate header, onto wavelength $\lambda_1$ on Link 1; similarly, stream D', E', K' along with its header is optically modulated for propagation by wavelength $\lambda_2$ on Link 1; and so forth for Link 1. Concurrently, stream B,C,G with its header is optically modulated onto wavelength $\lambda_K$ of Link 2 by optical transmitter 1050, and similarly for the remaining header/packet streams of Link 2. Finally, optical switch 1060 serves to connect the optical streams to the corresponding links, as described with respect to FIG. 11. OLSAS system controller 1080 controls the operation of transmitter 1050 and switch 1060 as coordinated with SPRNG device 1070.

When the optical packets reach the optical switch 1060 of FIG. 10, the switching fabric is set in such a way that all packets used in one disjoint path (e.g., Link 1) leave the switch using the same output fiber, as now described with reference to FIG. 11.

Figure 11:
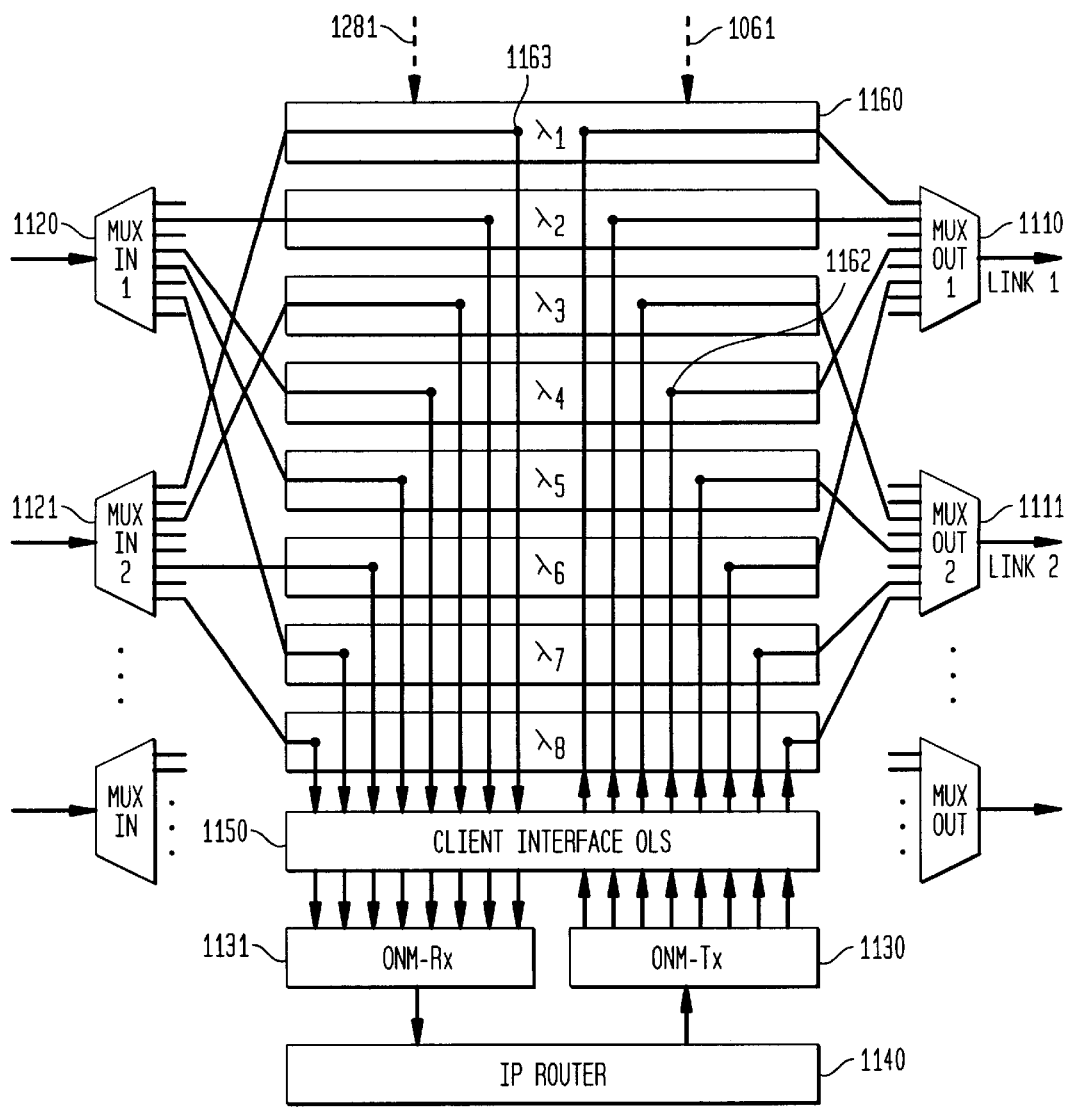
FIG. 11 illustrates the manner of transmitting and receiving packet streams from multiple optical links using the optical switch fabric.

FIG. 11 depicts the manner by which optical packets for two disjoint paths use two different output fibers to enter the WDM network from client interface 1150 via IP router 1140 and Optical Network Module transmitter (ONM-Tx) 1130 which, with reference to FIG. 10, encompasses IP packet multiplier 1020, packet buffers 1030 and 1031, cross-connect 1040, and SPRNG 1070. Optical switch 1160 is composed of a right-hand part for emitting optical signals, and a left-hand part for receiving optical signals. The right-hand part has been depicted by optical switch 1060 shown in FIG. 10 (the left-hand part is optical switch 1260 discussed shortly with respect to FIG. 12). Focusing on the right-hand part used for transmitting optical signals, switch 1160 is composed of switching points to switch the incoming optical signals propagated by client interface 1150 under control of signals arriving over path 1061 (from controller 1080 of FIG. 10); one such switching point is shown by reference numeral 1162. Using the optical signal conveyed by wavelength $\lambda_4$ as exemplary, switch 1160 closes switching point 1162 to couple the incoming optical signal to multiplexer 1110 which provides the multiplexed signals to optical Link 1. Similar comments applying with respect to each incoming optical signal which may be directed to either multiplexer 1110 or 1111. Thus, for the case of K=8 in FIG. 10 ($\lambda_1,\lambda_2, \ldots \lambda_8$), the optical signals with wavelengths $\lambda_1,\lambda_2,\lambda_4$, and $\lambda_6$ are switched by switch 1160 to multiplexer 111 0 for propagation over Link 1. Similarly, the optical signals with wavelengths $\lambda_3,\lambda_5,\lambda_7$, and $\lambda_8$ are switched by switch 1160 to multiplexer 1111 for propagation over Link 2.

Module 203 is essentially responsible for distributing the data packets for one session through a number of different wavelengths and disjoint paths. This set of wavelengths is a subset of the total number of wavelengths available in the network. The optical header carries encoded information that is then used at the receiver-side ONM to choose the subset of wavelengths used for the communication between a given source and destination, as now discussed.

Optical Network Module 204

Figure 12:
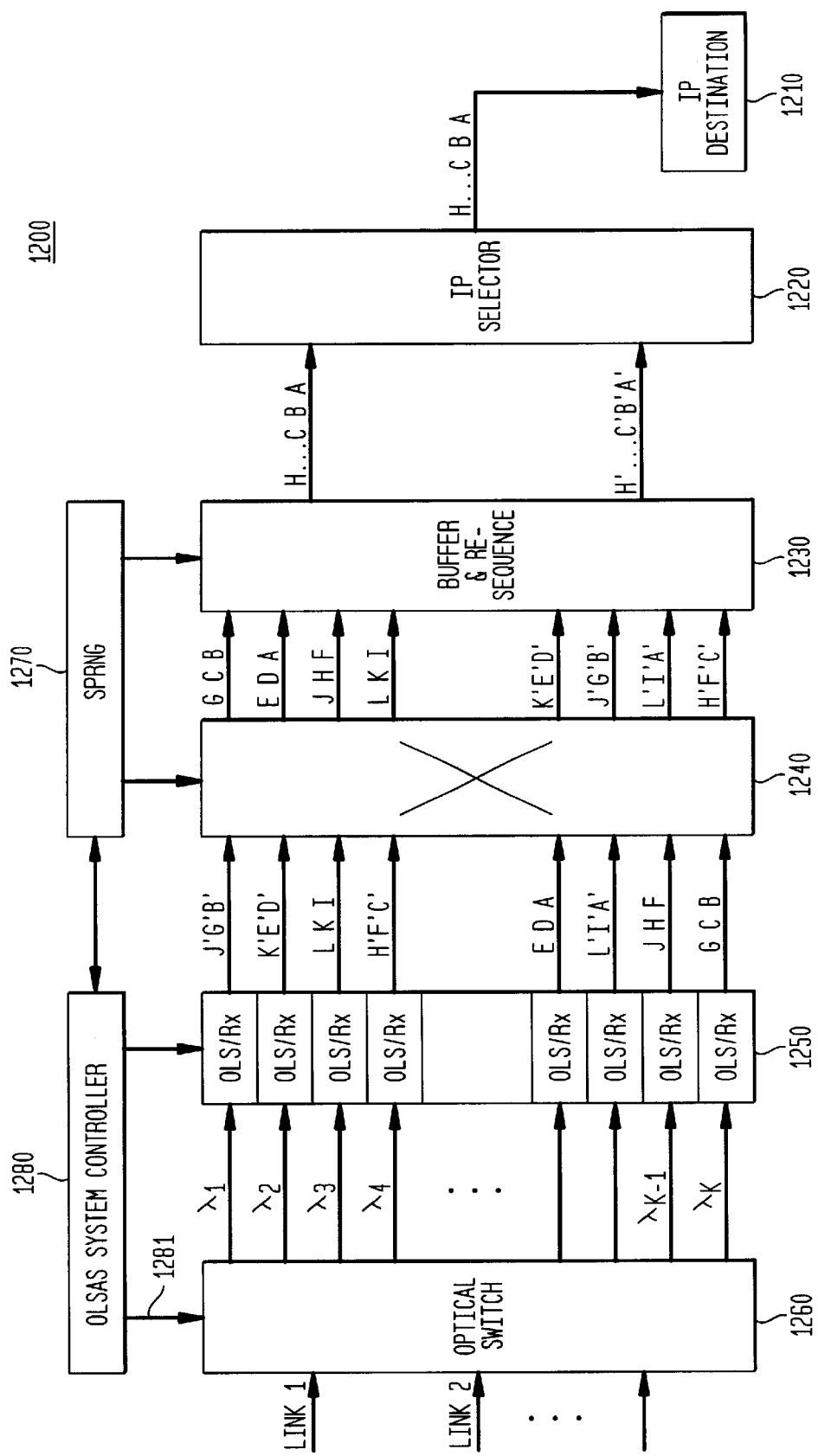
FIG. 12 is a high-level block diagram of the receive optical network module in accordance with the present invention.

At the receiver node of the optical transport network, the third type of module is deployed which is responsible for essentially the reverse functionality of the module located at the transmitter side, as shown in arrangement 1200 of FIG. 12. All the packets in a packet share are received over optical Links 1 and 2 at optical switch 1260, and the optical header of each packet is read. The security information included in each header, such as encoding key, is then forwarded to the OLSAS system controller 1280, which in turn passes this information to SPRNG device 1270. This information is subsequently used to retrieve the packets correctly at the appropriate wavelengths. Moreover, each wavelength is processed by Optical Label Switching Receiver 1250 to detect the packets. For example, receiver 1250 effects optical-to-electrical conversion of the packets arriving on wavelength $\lambda_1$ and produces electronic packets J', G', B'. The packets are then processed by cross-connect device 1240 in preparation for re-sequencing of the packets in buffer/resequencer 1230. As depicted, device 1240 receives its input from SPRNG element 1270 to re-associate the packets from the first stream (all of the "unprimed" packets A,B,C. . . , H) and the second stream (all the "primed" packets). Resequencer 1230 converts the buffered packet shares to the single stream A,B,C, . . . H, and similarly converts "primed" packet shares to the corresponding single stream. Finally, IP selector 1220 is used to choose one of the multiple disjoint paths that carry the information of a single communication session, and delivers this selected stream to the IP destination depicted by element 1210.

Again with reference to FIG. 11, the manner by which optical packets for two disjoint paths use two different output fibers to exit the WDM network through client interface 1150 via IP router 1140 and Optical Network Module receiver (ONM-Rx) 1131 which, with reference to FIG. 12, encompasses cross-connect 1240, buffer and resequencer 1230, IP selector 1220, and SPRNG 1270. The left-hand part of optical switch 1160 has been depicted by optical switch 1260 shown in FIG. 12. Focusing on the left-hand part used for receiving optical signals, switch 1160 is composed of switching points to switch the incoming optical signals propagated by the WDM network under control of signals arriving over path 1281 (from controller 1280 of FIG. 12); one such switching point is shown by reference numeral 1163. Using the optical signal conveyed by wavelength $\lambda_1$ as exemplary, switch 1160 closes switching point 1163 to couple the incoming optical signal from multiplexer 1120 to client interface 1150 and, in turn, to ONM-Rx 1131 and IP router 1140. Similar comments applying with respect to each incoming optical signal which may be directed from either multiplexer 1120 or 1121. Thus, for the case of K=8 in FIG. 12 ($\lambda_1,\lambda_2,\ldots\lambda_8$), the optical signals with wavelengths $\lambda_2,\lambda_4,\lambda_5$, and $\lambda_7$ are switched by switch 1160 as received from multiplexer 1120. Similarly, the optical signals with wavelengths $\lambda_1,\lambda_3,\lambda_6$, and $\lambda_8$ are switched by switch 1160 as received from multiplexer 1121.

Figure 13:
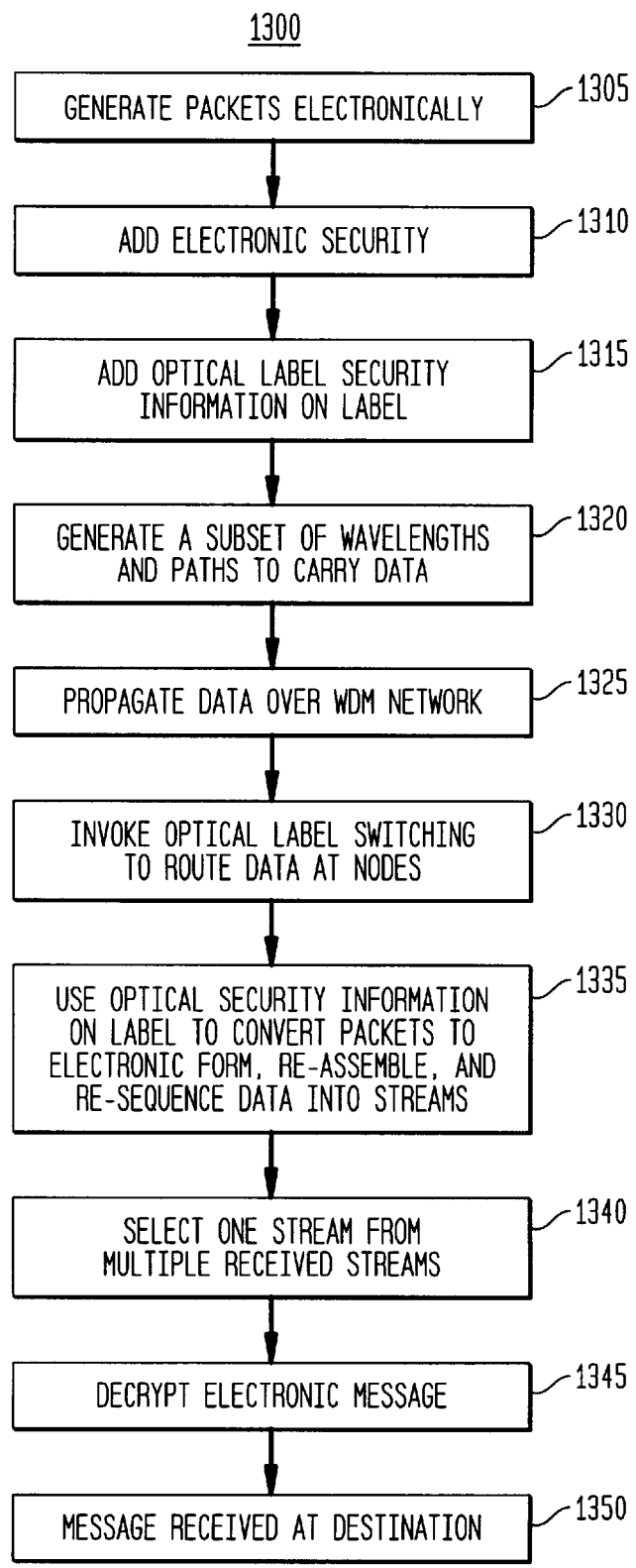
FIG. 13 is a high-level block diagram flow chart for the operation of the OLSAS system.

FIG. 13 summarizes the electronic and optical level security method with the help of high-level flowchart 1300. Initially, processing block 1305 operates to produce electronic packets. Next, the electronic packets are processed, to encapsulate the electronic packets with electronic security via block 1310, and then via block 1315, to add optical security information via the header, which also includes information to effect label switching at intermediate nodes. Processing block 1320 is invoked to generate a subset of wavelengths and links to carry the combined header/payload information. The header/payload information is propagated over the optical network (shown, for example, by "cloud" 110 of FIG. 1), as carried out by processing block 1325. As the header/payload packets propagate through the network, optical label switching is deployed to route the optical packets, as denoted by processing block 1330. In turn, as evidenced by processing block 1335, the packets are received via the original subset of wavelengths and corresponding links, and the optical security information on label is used to convert the packets to electronic form, and then re-assemble and re-sequenced to produce the received electronic packets which correspond to the input source packets. Block 1340 depicts processing wherein one stream from the plurality of detected streams is selected from delivery to the destination. Next, processing by block 1345 is invoked to decrypt the electronic message. Finally, as depicted by block 1350, a reproduced version of the original message is received at the destination.

(It is apparent that the level of security provided by this OLSAS technique depends on the number of wavelengths chosen over which to send the information, the total number of wavelengths available, and the frequency with which these (pseudo-random) subsets are changed, and also the number of paths over which the packets are spread (assuming that not all of the packets are sent via each disjoint path as per FIGS. 3A and 3B). Obviously, using just 16 out of 128 wavelengths (commercial systems provide 128 or more wavelengths) to carry the information yields an effective key size of more than 100 bits.)

Figure 14A:
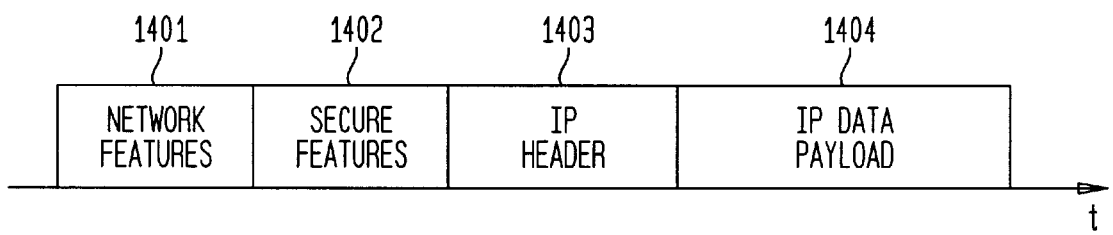
FIG. 14 depicts the arrangement of the security features information in a traditional use and as deployed in the WDM sub-carrier label-switching arrangement in accordance with the present invention.
Figure 14B:
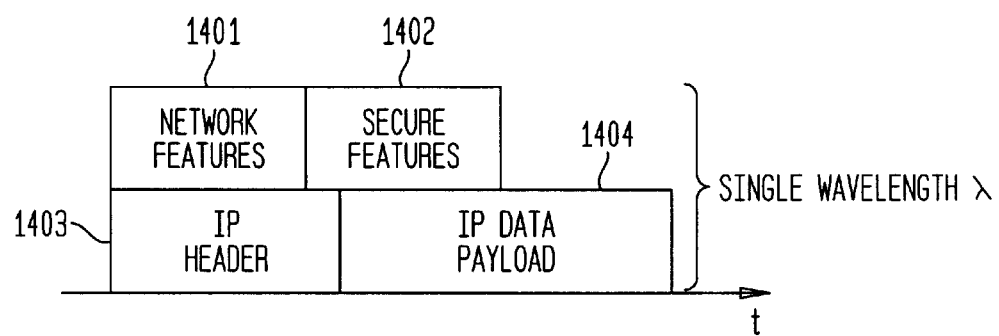

The optical header that carries additional security information may be implemented in the subcarrier domain, for which an illustrative embodiment is now described. FIG. 14 shows the optical packet including the subcarrier header, and contrasts the traditional "tag" approach (FIG. 14A) with the WDM subcarrier optical-label approach (FIG. 14B). In the traditional approach, the network features (1401) and the secure features (1402) are contiguous in time with the IP header (1403) and IP data payload 1404). With "subcarrier optical labeling", as depicted in FIG. 14B, the network features and the secure features are propagated on a given wavelength concurrently with the IP header and IP data payload, but are displaced in frequency.

So-called optical-label swapping is required in the IP routers attached to the transmit module of the OLSAS system so as to perform packet forwarding in this multiple-path approach. Optical-label swapping can be achieved with either a header insertion technique (a new label is introduced by adding a new subcarrier frequency without removing the old one) or a header replacement technique (a new label is introduced by replacing the old subcarrier information with a new one). These techniques are now described shortly.

Secure Optical Layer Control Module (SOLCM)

With reference to FIG. 15, secure optical layer control module 1510 creates and distributes messages to ONMs 1530 and 1535 using the Secure Optical Layer Control Protocol (SOLCP) on links 1511 and 1512; ONM 1530 couples secure data network 1515 to public optical network 1525, and ONM 1535 couples secure data network 1520 to public network 1525. Module 1510 has the important function of maintaining information on the status of the network as a whole, that is, public optical network 1525, and module 1510 communicates with ONMs 1530 and 1535 via a set of SOLCP messages. Such messages may require ONM 1530 or 1535 to perform a specific task, or the messages may be queries for alarms, alerts, link status, available wavelengths, and so forth. This control operation can process data on link status within network 1525. For example, module 1510 can use statistical information about packet loss, throughput, and delay to develop a database of links that are the "best" links to use for any given transmission application. Module 1510 can also periodically send explicitly routed, time-stamped packets into the network to generate network status data. Module 1510 can be merged or integrated with NC&M 520 to create a "secure NC&M" module, that is, the functionality required of the SOLCM can be effected by the NC&M as well.

Optical Header Processing

Figure 16:
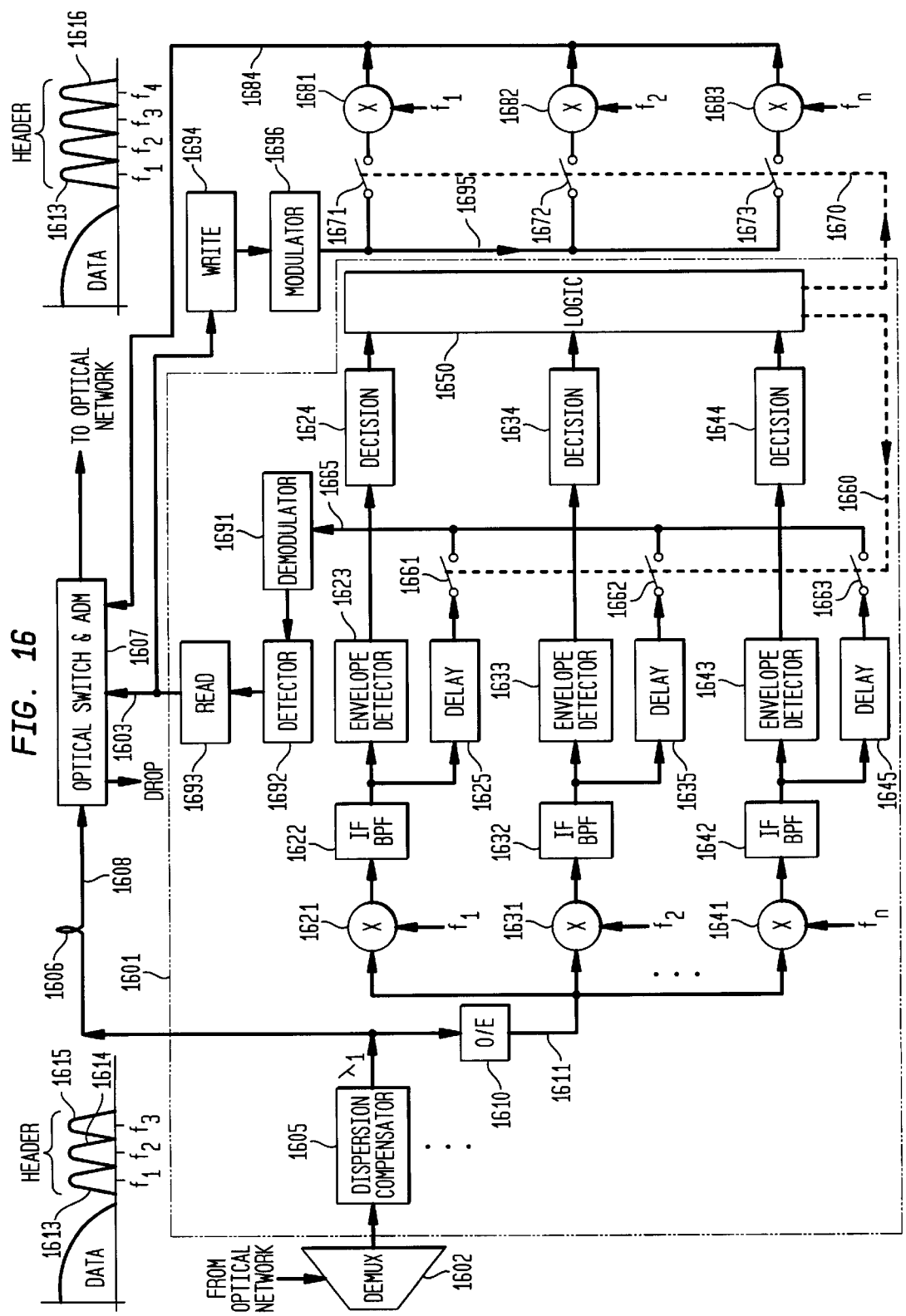
FIG. 16 is a block diagram of circuitry for detecting the active header signal and for inserting a new active header signal without local injection of light.

The foregoing description focused on optical header processing at a level commensurate with the description of the overall NGI system configured with the overlaid security/survivability network modules. Discussion of header processing at a more detailed level is now appropriate so as to exemplify how survivability and security can be achieved at the circuit-detail level. To this end, the arrangement of FIG. 16 is considered. As seen in FIG. 16, optical header processor 1601 has as its input an optical signal via demux 1602. In particular, optical header processor 1601 includes in this embodiment: (a) dispersion compensator 1605 for correcting dispersion in the optical signal at optical wavelength $\lambda_1$ emanating from demux 1602; (b) optical-electrical converter 1610 (e.g., a photodetector) for producing electrical output signal 1611 from the optical signal departing compensator 1605; (c) a bank of local oscillators having frequencies $f_1, f_2, \ldots, f_N$ feeding multipliers 1621, 1631, ..., 1641, respectively, for frequency-shifting the frequency components of electrical signal 1611 to intermediate frequencies (IFs); (d) a bank of IF band-pass-filters (IF-BPF) 1622, 1632, ..., 1642 responsive to multipliers 1621, 1631, ..., 1641, respectively, to filter the frequency domain energy in header signals 1613, ..., 1615 shown at the top left-hand of FIG. 16; (e) a cascade of envelope detector/decision circuit pairs 1623/1624, 1633/1634, ..., 1643/1644 wherein the presence of frequency domain energy in any of the frequency bands centered at $f_1, f_2, \ldots, f_N$ is denoted as a logic '1' at the output of the decision circuits 1624, 1634, ..., 1644, whereas the absence of frequency domain energy at $f_1, f_2, \ldots, f_N$ is denoted as a logic '0'; (f) logic circuit 1650 which provides a switch selection signal on selection lead 1660, the function of which being discussed in more detail in the operational description below; (g) delay circuits 1625, 1635, ..., 1645 coupled to the BPF filters 1622, ..., 1642; (h) switches 1661, 1662, ..., 1663, coupled to delay circuits 1625, . . . , 1645 as inputs, and being controlled by the signal on lead 1660; (g) input lead 1665, connected to switches 1661, . . . , 1663, which serve as an input to demodulator 1691; (h) detector 1692 responsive to demodulator 1691; and (i) read circuit 1693 which outputs signal 1603—this signal is processed by optical switch 1607 to control operation of switching action.

The operation of header detector 1601 of FIG. 16 is as follows. It is assumed that the optical signal from the optical network (e.g., as received from optical network module 432 of FIG. 4) propagates a 2.5 Gbps IP data packet (e.g., with QPSK/QAM modulation) which is sub-carrier multiplexed with a 155 Mbps header packet (e.g., with QAM modulation) at a center frequency $f_1$; as before, the header precedes the data payload in time and both are carried by the optical wavelength $\lambda_1$. In each network node which receives the combined header and payload at wavelength $\lambda_1$, the sub-carrier header at $f_1$ is detected by envelope detector 1623. Because there is energy present in the frequency band centered at $f_1$ due to the existence of the header signal, decision circuit 1624 detects a logic '1', whereas all other decision circuits detect a logic '0'. This combination of logic signals ('100 . . . 0') in parallel at the input to logic circuit 1650 generates the selection signal 1660 which effects the closure of only switch 1661. (It is important to emphasize that the input logic signals are generated concurrently and in parallel, rather than in series, thereby significantly speeding up the header detection process.) The actual header signal provided at the output of IF-BPF 1622 serves, after the delay imposed by delay circuit 1625, as the input to demodulator 1691 via lead 1665. The delay of circuit 1625 is not critical, other than the delay is greater than the time required to derive the logic signal via envelope detector 1623 and decision circuit 1624, plus the time required to compute the control signal on selection signal lead 1660 in logic circuit 1650 and to close switch 1661. (The delay can be implemented digitally, e.g., by replacing each analog delay in FIG. 16 by a cascade of a demodulator and a digital delay.) Therefore, the header signal at $f_1$ is the only header signal that will be demodulated by demodulator 1691 (e.g., a QAM demodulator), and the demodulated baseband data burst is then detected by detector 1692 (e.g., a 155 Mbps burst-mode receiver), and read by circuit 1693 (e.g., a microprocessor).

This foregoing operational description has focused only on the detection of the optical header to control the routing path through switching device 710 of FIG. 7. As alluded to above, header replacement is now considered important to present-day NGI technology so as to accomplish high-throughput operation in a packet switched network in which data paths change due to, for example, link outages and variable traffic patterns. Moreover, header replacement is useful to maintain protocol compatibility. The components of FIG. 16 which have heretofore not been described play a central role in header replacement. Actually, the notion of header replacement has a broader connotation in that the header may be composed of various fields, such as a "label" field and a "time-to-leave" field. The description to this point has used the header and label interchangeably; however, it is now clear that the header may actually have a plurality of fields, and as such any or all may be replaced at any node.

Now continuing with the description of FIG. 16, it is shown that logic circuit 1650 also provides a second selection signal on selection lead 1670; this lead control switches 1671, 1672, . . . , 1673 which are all connected to lead 1695. Interposed between lead 1695 and header output lead 1603 is write circuit 1694 in cascade with modulator 1696. Write circuit 1694 is responsible for providing a new header signal. The header signal that arrives at the input to demux 1602 is referred to as the active header signal—in the first node to process the header signal, the active header signal and the original header signal coalesce. The new header signal, rather than actually overwriting the active header signal, is placed in a frequency band above the frequency band of the active header signal, that is, the next highest available center frequency from the set $f_1, f_2, \ldots, f_N$ is utilized to propagate the new header signal. To select the next highest available center frequency, logic circuit 1650 is arranged so that if decision circuits 1624, 1634, . . . , 1644 yield an active center frequency $f_i$, then selection signal 1670 will close only the switch from the set 1671, 1672, . . . , 1673 which connects lead 1695 to center frequency $f_{i+1}$. That is, lead 1695 will be connected to the multiplier from the set 1681, 1682, . . . , 1683 which corresponds to frequency $f_{i+1}$. The outputs of multipliers 1681, 1682, . . . , 1683 are connected to lead 1684, which serves as a second input to optical switch/add-drop multiplexer 1607; the other input is provided by the header signal on lead 1063. Circuit 1607 now has a dual functionality, namely, it operates as switching device 730 of FIG. 7, but is also arranged to convert an input electrical signal, such as on lead 1684, to an optical signal for propagation by the same optical wavelength present at the input to circuit 1607 (in this case, wavelength $\lambda_1$). Accordingly, the new header signal on lead 1684 is frequency shifted above the data payload as well as all other existing headers arriving on lead 1608; this is shown in frequency domain visualization in the top right-hand corner of FIG. 16, which is counterpart of the visualization in the top left-hand corner. So that the new header signal is placed ahead of the data payload in time, delay is introduced by fiber loop 1606.

The operation of the arrangement of FIG. 16 for header replacement is as follows. Again, the same example is used so that an optical header plus a data payload is incoming to the network node immediately following the node that injected the packet. It is desired to write a new header signal, and in the embodiment of FIG. 16, the output of read circuit 1693 serves as an input to write circuit 1694; in this manner, the active header signal may serve as an aid in computing the new header signal. The new header signal is conveyed by center frequency $f_2$ since the incoming active header signal is centered about $f_1$. In effect, the new header signal is written on the original light which contains both the data packet and the old sub-carrier header or active header signal at $f_1$. Therefore, the modulated light which leaves the given node contains the data packet and two sub-carrier header signals. (Two illustrative writing techniques, both of which use a high-speed (~10 GHz) LiNbO$_3$-based modulator/switch, will be explained later.) The carrier frequency $f_2$ is higher than $f_1$ by about 200 MHz for the 155 Mbps data, but the frequency difference between $f_1$ and $f_2$ can be smaller if a more spectral efficient modulation method such as M-QAM is adopted. Note that this node has the intelligence via logic circuit 1650 to know that the active header signal uses sub-carrier $f_1$ and the new header signal is written onto sub-carrier $f_2$.

In a similar manner, the third network node along the route will read the active header signal on sub-carrier $f_2$ and write a new header information onto sub-carrier $f_3$, and the process continues until the modulation bandwidth of optical switch/ADM 1607 is exhausted. For example, a typical 10 GHz external LiNbO$_3$-based modulator/switch can write about 40 ((10-2)/0.2) new sub-carrier headers signals, where it has been assumed that the 2.5 Gbps data occupies a bandwidth of 2 Ghz.

FIG. 16 actually illustrates the implementation details of the fourth network node along the route over which a packet travels. The three sub-carrier headers on $\lambda_1$ are simultaneously down-converted to IF band, and due to their existence, decision circuits 1624, 1634, . . . , 1644 generate a logic '1' signal to logic circuit 1650 in the pattern "111000 . . . 000". Note that if there are 40 down-converters in this example, 37 decision circuits will generate logic '0's because there are no sub-carriers on $f_4, f_5, \ldots f_{40}$. Logic circuit 1650 uses the output "1110000 . . . 0" (three ones and thirty-seven zeros) to control the 40 microwave switches 1661, 1662, . . . , 1663 such that only the third microwave switch is closed and all other 39 switches are open. Therefore, the header information on $f_3$ becomes the active header signal that is then demodulated by demodulator 1691. Immediately after the "read" process, the new header signal is generated by write circuit 1694 and then applied to modulator 1696 at IF. As depicted in FIG. 16, the new header signal is launched to the fourth microwave switch which is turned on by selection signal 1670. The new header signal is then up-converted by $f_4$, and is used to modulate the delayed main-path signal on optical path 1608 (which originally contains only three sub-carrier headers). The resultant modulated light therefore contains four sub-carrier headers as depicted in the frequency domain visualization in the top right-hand corner of FIG. 16 with the new header signal represented as header 1616.

It is noted that, in terms of presently available components, the processing time of the envelope detectors (1623, . . . ), the decision circuits (1624, . . . ), the logic circuit (1650), and the turning-on of a particular microwave switch (1661, . . . ) should take less than 30 ns. On the other hand, if it is assumed that there are 15 bits in each packet header signal, then the time to read 15 bits, write 15 bits, and add 10 preamble bits can take about 260 ns for a 155 Mbps burst. Therefore, allowing for some variations, each header signal is about 300 ns. This means that the length of delay line 1606 in main optical path 1608 should be around 60 meters.

There exist some upper bounds on the proposed sub-carrier header insertion technique of FIG. 16: (a) the sub-carriers at carrier frequencies as high as 10 GHz can become severely attenuated due to fiber dispersion after a certain transmission distance (usually tens of kilometers). Fortunately, this problem can be solved by repeatedly using dispersion compensation fibers (such as compensator 1605) or chirped fiber gratings at every network node; (b) at each intermediate network node, its modulator 1696 (e.g., a LiNbO$_3$-based modulator) modulates the incoming "modulated" light by a new sub-carrier header signal, and this can cause new intermodulation distortion products. However, the present technology is such that the nonlinear distortion penalty after 40 times of writing consecutive sub-carrier header signals is not large enough to degrade the bit-error-ratio (BER) of both the data payload and the sub-carrier header signal up to a distance of 2000 km; and (c) since the maximum number of insertable subcarrier header signals are about 40 using a 10 GHz modulator, at some point in the network the entire sub-carrier header signals will have to be erased so that a new set of sub-carrier header signals can be written onto the received light all over again. Being conservative, it is determined that the maximum transmission distance using the arrangement of FIG. 16 is about 2000 km. Therefore, it is feasible that several "reset" network nodes are implemented, configured as in FIG. 17, which are sparsely located across the nation, to guarantee that the 40 times-writing limit is never exceeded. It is noted, however, that not every node will insert a new header signal (recall the new header signal is typically inserted due to slowly varying network outages or for protocol compatibility). If this is indeed the case, then it is anticipated that 40 header signal insertions are more than enough to cover any cross-nation transport of an optical packet.

Figure 17:
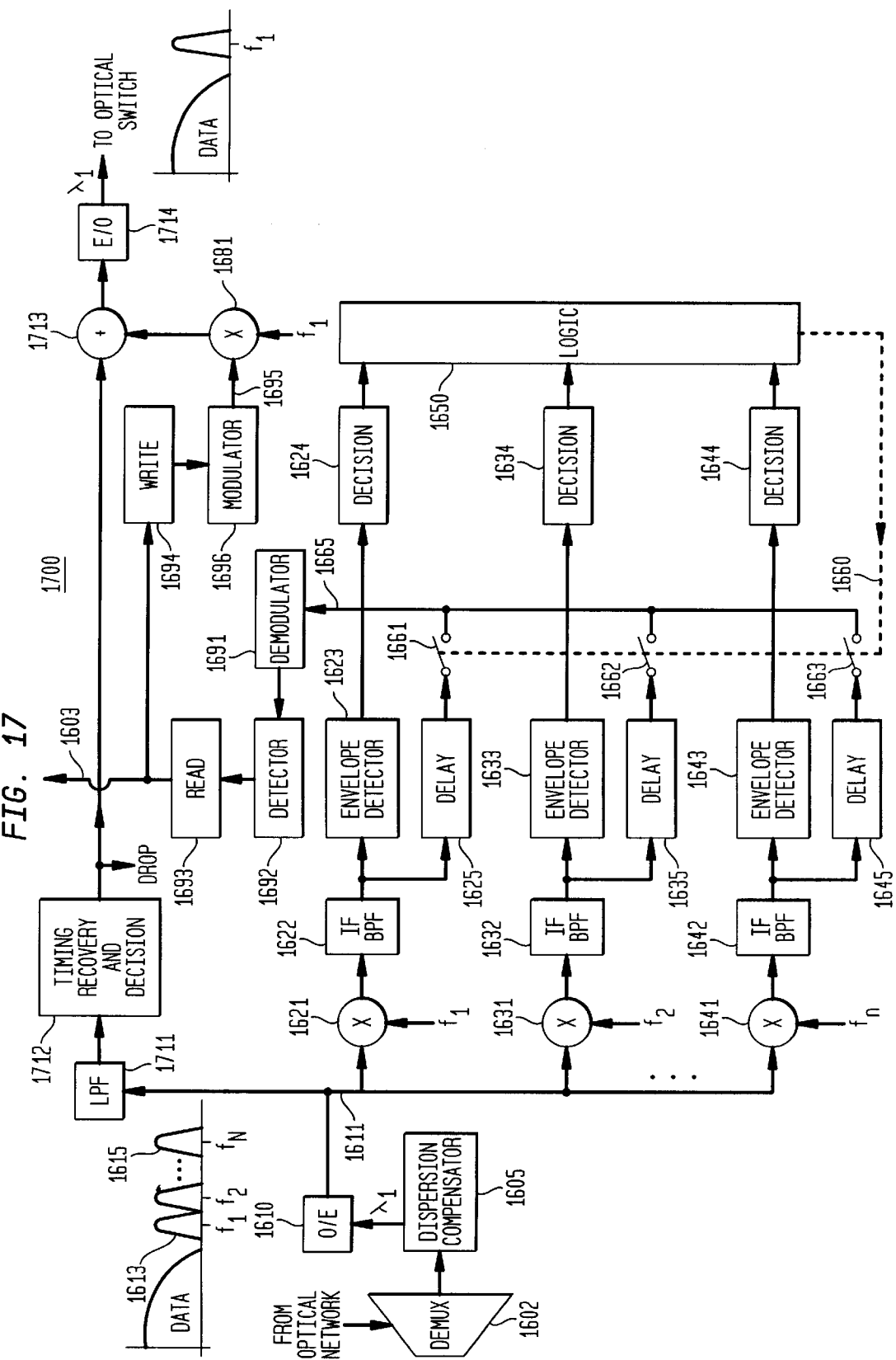
FIG. 17 is a block diagram of re-set circuitry for deleting all incoming header signals, and for inserting a new original header signal.

However, to be sure that a new header signal can be inserted when needed, preferably some or even all of the network nodes are arranged with the circuitry 1700 of FIG. 17. The primary difference between FIGS. 16 and 17 is in the upper path of FIG. 16 wherein the main-path optical signal appearing at the output of compensator 1605 is converted back to electrical domain via opto-electrical converter 1610, with all of its old sub-carrier header signals being erased by using low-pass filter (LPF) 1711. A new, single sub-carrier header signal centered at frequency $f_1$ is added to the regenerated data payload in electrical adder 1713; the data payload is regenerated in the conventional electrical manner by timing recovery-and-decision circuitry 1712. Together the data payload and new header signal modulate electrical-optical transmitter 1714 having the same wavelength $\lambda_1$. Therefore, from this reset node on, another 40 sub-carrier header signals can be written before there is the (unlikely) need to reset again.

Another Illustrative Embodiment of a Header Insertion Technique

Figure 18:
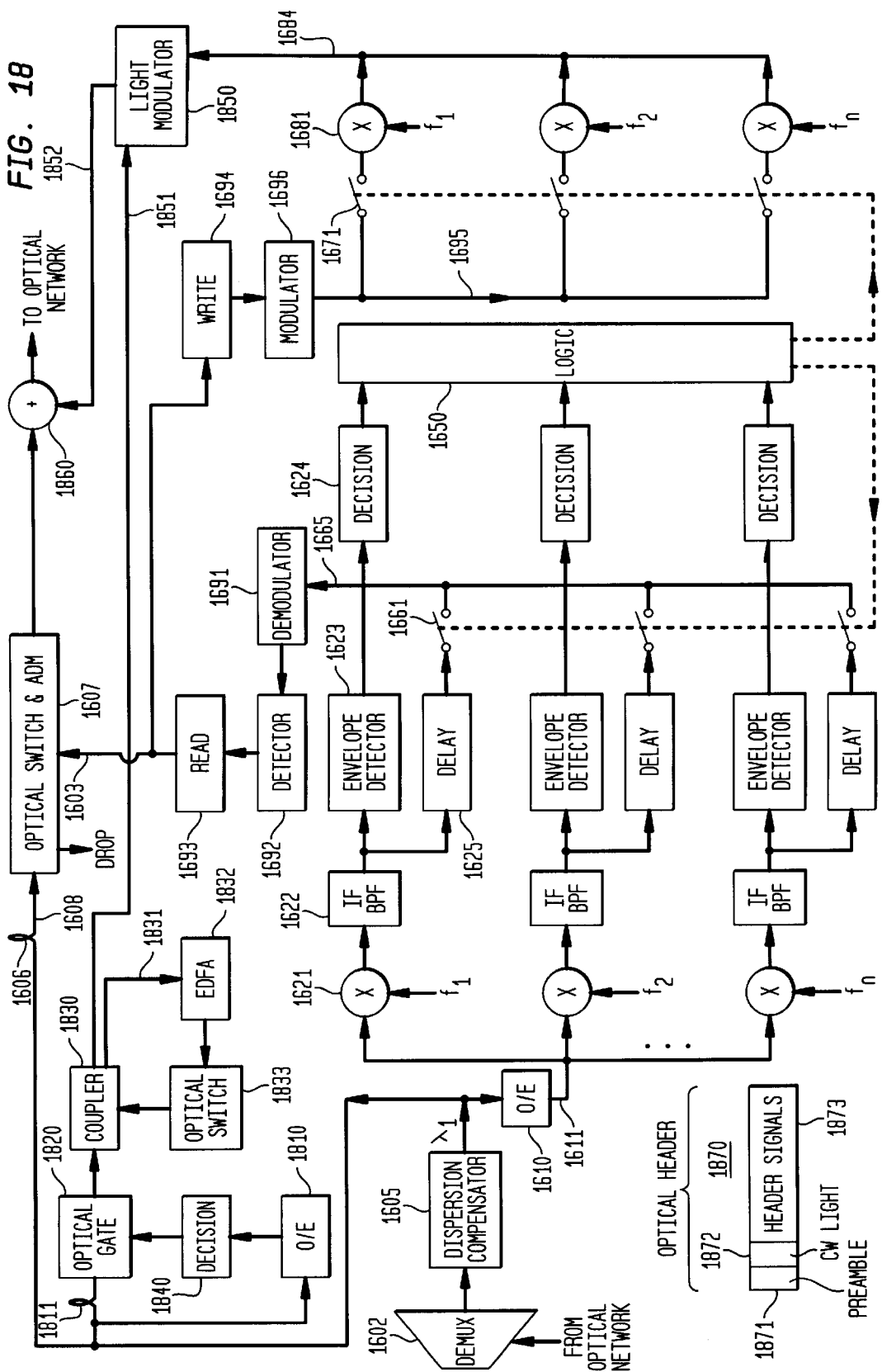
FIG. 18 is a block diagram of circuitry for detecting the active header signal and for inserting a new active header signal using the local injection of light.

The circuit arrangements of FIGS. 16 and 17 were realized without the need for local light injection. In order to increase the transmission distance beyond the anticipated 2000 km limit, another node header processing arrangement is required, as now depicted in FIG. 18; this arrangement deploys the injection of local light at wavelength $\lambda_1$. The main difference between FIG. 16 and FIG. 18 is shown the processing path composed of the following components: (a) opto-electrical converter 1810; (b) decision circuit 1840 responsive to converter 1810; (c) the series arrangement of delay line 1811 and optical gate 1820, with delay line 1811 being responsive to the output of compensator 1605; (d) coupler 1830 responsive to gate 1820; (e) light feedback path 1831 for feeding output light from coupler 1830 to its input, path 1831 being composed of erbium-doped fiber amplifier (EDFA) 1832 and optical switch 1833; (f) light modulator 1850 responsive to the electrical signal appearing on path 1684, as before; and (g) optical adder 1860 responsive to both light modulator 1850 and optical switch/ADM 1607. An augmented optical packet 1870, with the form shown in the lower left corner of FIG. 18, now arrives at the network node of FIG. 18 via the optical input path. Preamble 1871 in optical packet header 1870, after optical-to-electrical conversion in opto-electrical converter 1810, directs detection circuit 1840 to turn on optical gate 1820 and let short CW light burst 1872 (about 30 ns in duration) at $\lambda_1$ pass through to coupler 1830. CW light burst 1872 then loops several times via feedback path 1831 to lengthen the CW light duration to about 300 ns; this extended duration CW burst serves as an input to light modulator 1850 via output path 1851 from coupler 1830. The new sub-carrier header signal appearing on lead 1684 then modulates this locally regenerated CW light burst on lead 1852 via light modulator 1850 (e.g., via a LiNbO$_3$ modulator). The modulated light which appears on output lead 1852 of light modulator 1850, containing only the new, active sub-carrier header signal, is then combined in optical adder 1860 along with the main-path light which contains the data payload and the old sub-carrier header signals as emitted by switch 1607. The time of occurrence of the new sub-carrier header signal arrives essentially concurrently with original optical packet

1870 at optical adder 1860. (In an intermediate network node, it is important for the node to re-modulate the new header onto the original wavelength in the same time frame as the payload data.) Thus the light pulse conveying the new active header signal occupies the same time interval as the incoming header signals 1873, with the difference being that the old header signals and the new active header signal are separated in the frequency domain by their corresponding sub-carrier frequencies. That is, each time a new header signal is added, the light conveying the new header signal at the given wavelength $\lambda_1$ is overlaid on the incoming light signal conveying the old header signals, but being such that the frequency domain characteristics are determined by the sub-carrier frequencies.

With this technique, no additional nonlinear distortions are generated due to the modulation of an already modulated light. As long as the optical power ratio between the main-path light from switch 1607 and the locally-injected light from light modulator 1850 is optimized, and the modulation depths of the sub-carrier headers and data payload are optimized, transmission can be beyond 2000 km is effected.

An Alternative Header Replacement Technique

Figure 19:
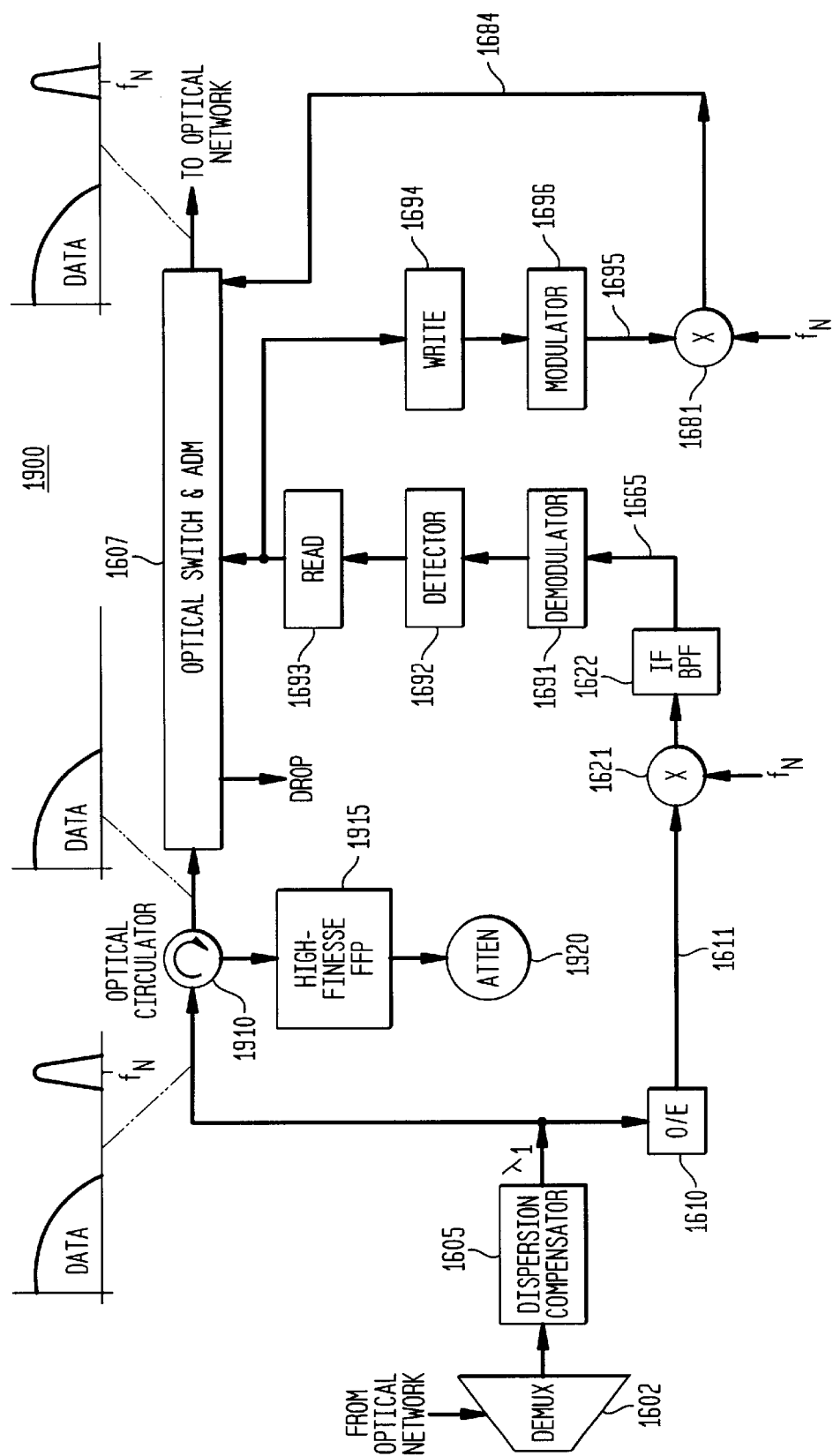
FIG. 19 is a block diagram of circuitry for removing a single header signal and replacing the removed header signal with a new header signal.

It is also possible to use an optical notch filter which has a very high finesse to notch out the old sub-carrier header signal. The network node configuration 1900 is shown in FIG. 19; it is readily appreciated that node configuration 1900 is greatly simplified relative to the implementation of FIG. 16. The sub-carrier header signal centered at $f_N$ is purposely allocated at high-frequency carrier (e.g., 9 GHz) so that the header signal conveyed $f_N$ will not affect the data payload in the low frequency region. The output of compensator 1605 feeds optical circulator 1910, which is coupled to fiber Fabry-Perot (FFP) notch filter 1915 and attenuator 1920 in series. The combined effect of these components is to notch out the header signal centered at $f_N$; the spectrum of the input to optical circulator 1910 is shown in the top left corner, whereas the spectrum of the output of circulator 1910 is shown in the top center. The newly inserted header signal is provided by the series combination: write circuit 1694; modulator 1696; up-converter 1681 being driven by sub-carrier $f_N$, in a much simplified manner as that of FIG. 16.

Optical Technology

Optical technologies span a number of important aspects realizing the present invention. These include optical header technology, optical multiplexing technology, optical switching technology, and wavelength conversion technology.

(a) Optical Header Technology

Optical header technology includes optical header encoding and optical header removal as discussed with respect to FIGS. 6 and 7. In effect, optical header 510 serves as a signaling messenger to the network elements informing the network elements of the destination, the source, and the length of the packet. Header 510 is displaced in time compared to the actual data payload. This allows the data payload to have any data rates/protocols or formats.

(b) Optical Multiplexing Technology

Optical multiplexing may illustratively be implemented using the known silica arrayed waveguide grating structure. This waveguide grating structure has a number of unique advantages including: low cost, scalability, low loss, uniformity, and compactness.

(c) Optical Switching Technology

Fast optical switches are essential to achieving packet routing without requiring excessively long fiber delay as a buffer.

Micromachined Electro Mechanical Switches offer the best combination of the desirable characteristics: scalability, low loss, polarization insensitivity, fast switching, and robust operation. Recently reported result on the MEM based Optical Add-Drop Switch achieved 9 microsecond switching time (d) Wavelength Conversion Technology Wavelength conversion resolves packet contention without requiring path deflection or packet buffering. Both path deflection and packet buffering cast the danger of skewing the sequences of a series of packets. In addition, the packet buffering is limited in duration as well as in capacity, and often requires non-transparent methods. Wavelength conversion, on the other hand, resolves the blocking by transmitting at an alternate wavelength through the same path, resulting in the identical delay. Illustratively, a WSXC with a limited wavelength conversion capability is deployed.

Although various embodiments which incorporate the teachings of the present invention have been shown and described in detail herein, those skilled in the art can readily devise many other varied embodiments that still incorporate these teachings.

What is claimed is:

1. A method for propagating an input data payload received from a source over an optical network to effect survivability and security, the optical network including optical nodes and optical links interconnecting the nodes, one of the nodes serving as an input node for the input data payload, the input node being coupled to a plurality of the links, the method comprising the steps of generating replicated versions of the input data payload, and optically transmitting each of the replicated versions of the data payload over a corresponding one of the plurality of links.

2. The method as recited in claim 1 wherein each of the links includes multiple optical wavelengths and wherein the step of optically transmitting includes the step of propagating each of the replicated versions of the data payload over a selected one of the wavelengths composing said one of the corresponding links.

3. The method as recited in claim 1 wherein each of the links includes multiple optical wavelengths and wherein the step of optically transmitting includes the step of propagating a subset of each of the replicated versions of the data payload over a selected one of the wavelengths composing said one of the corresponding links.

4. The method as recited in claim 3 wherein the step of generating includes the steps of electronically duplicating the data payload and buffering each duplicated data payload.

5. The method as recited in claim 1 wherein the step of optically transmitting each of the replicated versions of the data payload includes the steps of adding an optical header to each data payload and assigning a route for the header and its associated data payload through the optical network based upon a time-dependent assignment algorithm.

6. The method as recited in claim 5 wherein the time-dependent assignment algorithm is based upon generating secure pseudo-random numbers.

7. The method as recited in claim 5 wherein the step of adding the header includes the step of adding information to the header representative of the time-dependent assignment algorithm.

8. A method for propagating a series of input data payloads received from a source over an optical network to effect survivability and security, the optical network including optical nodes and optical links interconnecting the nodes, one of the nodes serving as an input node for the data payloads, the input node being coupled to a plurality of the links, the method comprising the steps of partitioning the series of data payloads into subsets, and optically transmitting each of the subsets over a corresponding one of the plurality of links.

9. The method as recited in claim 8 wherein each of the links includes multiple optical wavelengths and wherein the step of optically transmitting includes the step of propagating each of the subsets over a selected one of the wavelengths composing said one of the corresponding links.

10. The method as recited in claim 8 further including, prior to the step of partitioning, the step of generating replicated versions of the series of input data payloads, and the step of partitioning includes the step of forming the subsets from the replicated versions of the series.

11. The method as recited in claim 10 wherein the step of generating includes the step of electronically duplicating the series of data payloads.

12. The method as recited in claim 11 wherein the step of generating includes the step of buffering each duplicated series of data payloads.

13. The method as recited in claim 8 wherein the step of optically transmitting each of the subsets includes the steps of adding an optical header to each of the data payloads in each of the subsets and assigning a route for the header and each associated data payload through the optical network based upon a time-dependent assignment algorithm.

14. The method as recited in claim 13 wherein the time-dependent assignment algorithm is based upon generating secure pseudo-random numbers.

15. The method as recited in claim 8 wherein the step of optically transmitting over one of the corresponding links includes the step of assigning said one of the corresponding links based upon a time-dependent assignment algorithm.

16. The method as recited in claim 15 wherein the step of adding the header includes the step of adding information to the header representative of the time-dependent assignment algorithm.

17. A method for propagating a series of data payloads received from a source over an optical network to effect survivability and security, the optical network including optical nodes and optical links interconnecting the nodes, one of the nodes serving as an input node for the data payload, the input node being coupled to a plurality of links wherein each of the plurality of links is composed of multiple optical wavelengths, the method comprising the steps of generating and buffering replicated copies of the series of data payloads in the input node, interleaving each of the stored copies to produce a corresponding plurality of interleaved streams, each of the interleaved streams being composed of a subset of the series of data payloads, and optically transmitting each of the plurality interleaved streams over one of the links using a corresponding one of the optical wavelengths.

18. The method as recited in claim 17 further including, after the step of interleaving, the step of re-ordering each of the interleaved data streams.

19. The method as recited in claim 17 wherein the step of optically transmitting each of the interleaved streams includes the steps of adding an optical header to each data payload and assigning a route for the header and its associated data payload through the optical network based upon a time-dependent assignment algorithm.

20. The method as recited in claim 19 wherein the time-dependent assignment algorithm is based upon generating secure pseudo-random numbers.

21. The method as recited in claim 20 wherein the step of adding the header includes the step of adding information to the header representative of the time-dependent assignment algorithm.

22. A method for propagating a series of data payloads received from a source over an optical network to effect survivability and security, the optical network including optical nodes and optical links interconnecting the nodes, one of the nodes serving as an input node for the data payload, the input node being coupled to a plurality of links wherein each of the plurality of links is composed of multiple optical wavelengths, the method comprising the steps of generating and buffering replicated copies of the series of data payloads in the input node, interleaving each of the stored copies to produce a corresponding plurality of interleaved streams, each of the interleaved streams being composed of a subset of the series of data payloads, re-ordering the subsets composing each of the interleaved streams to produce a plurality of re-ordered streams, and optically transmitting each of the plurality re-ordered streams over one of the links using a corresponding one of the optical wavelengths.

23. The method as recited in claim 22 wherein the step of optically transmitting each of the interleaved streams includes the steps of adding an optical header to each data payload and assigning a route for the header and associated data payload through the optical network based upon a time-dependent assignment algorithm.

24. The method as recited in claim 23 wherein the steps of interleaving and re-ordering are based upon a time-changing algorithm.

25. The method as recited in claim 24 wherein the time-dependent assignment algorithm and the time-changing algorithm are based upon generating secure pseudo-random numbers.

26. The method as recited in claim 25 wherein the step of adding the header includes the step of adding information to the header representative of the time-dependent algorithm and of the time-changing algorithm.

27. A method for receiving an input data payload originated by a source and destined for a receiver, the data payload being propagated over an optical network, the optical network including optical nodes and optical links interconnecting the nodes, wherein an input node is responsive to the source and is arranged to optically transmit replicated versions of the data payload over a plurality of corresponding links, and wherein an output node is coupled to the receiver, the method comprising the steps of detecting each of the replicated versions of the data payload arriving at the output node as propagated over the plurality of corresponding links, and selecting one of the replicated versions of the data payload as representative of the packet originated by the source.

28. A method for propagating an input data payload received from a source over an optical network to effect survivability and security, the optical network including optical nodes and optical links interconnecting the nodes, one of the nodes serving as an input node for the input data payload and another of the nodes serving as an output node, the input and output nodes being interconnected by a plurality of the links, the method comprising the steps of generating replicated versions of the input data payload, optically transmitting each of the replicated versions of the data payload over a corresponding one of the plurality of interconnecting links, detecting each of the replicated versions of the data payload arriving at the output node as propagated over the interconnecting links, and selecting one of the replicated versions of the data payload as representative of the data payload originated by the source.

29. A system for propagating an input data payload received from a source over an optical network to effect survivability and security, the optical network including optical nodes and optical links interconnecting the nodes, one of the nodes serving as an input node for the input data payload, the input node being coupled to a plurality of the links, the system comprising a data payload generator for generating replicated versions of the input data payload, and an optical transmitter for transmitting each of the replicated versions of the data payload over a corresponding one of the links.

30. The system as recited in claim 29 wherein each of the links includes multiple optical wavelengths and wherein optical transmitter includes means for propagating each of the replicated versions of the data payload over a selected one of the wavelengths composing said one of the corresponding links.

31. The system as recited in claim 29 wherein the transmitter includes an electronic multiplier for duplicating the data payload.

32. The system as recited in claim 31 wherein the generator includes a storage device for buffering each duplicated data payload.

33. The system as recited in claim 29 wherein optical transmitter includes the an header encoder for adding an optical header to the data payload and means for assigning a route for the header and its associated data payload through the optical network based upon a time-dependent assignment algorithm generator.

34. The system as recited in claim 33 wherein the time-dependent assignment algorithm generator generates secure pseudo-random numbers.

35. The system as recited in claim 33 wherein the header includes detection information representative of the time-dependent assignment algorithm generator and the header encoder includes means for adding the detection information.

36. A system for propagating a series of input data payloads received from a source over an optical network to effect survivability and security, the optical network including optical nodes and optical links interconnecting the nodes, one of the nodes serving as an input node for the data payloads, the input node being coupled to a plurality of the links, the system comprising a data selector for partitioning the series of data payloads into subsets, and an optical transmitter for transmitting each of the subsets over a corresponding one of the plurality of links.

37. A system for propagating a series of data payloads received from a source over an optical network to effect survivability and security, the optical network including optical nodes and optical links interconnecting the nodes, one of the nodes serving as an input node for the data payload, the input node being coupled to a plurality of links wherein each of the plurality of links is composed of multiple optical wavelengths, the system comprising a generator for generating replicated copies of the series of data payloads in the input node, a device for buffering the replicated copies, a data selector for interleaving each of the stored copies to produce a corresponding plurality of interleaved streams, each of the interleaved streams being composed of a subset of the series of data payloads, means for re-ordering the subsets composing each of the interleaved streams to produce a plurality of re-ordered streams, and an optical transmitter for transmitting each of the plurality re-ordered streams over one of the links using a corresponding one of the optical wavelengths.

38. A system for propagating an input data payload received from a source over an optical network to effect survivability and security, the optical network including optical nodes and optical links interconnecting the nodes, one of the nodes serving as an input node for the input data payload and another of the nodes serving as an output node, the input and output nodes being interconnected by a plurality of the links, the system comprising a generator for generating replicated versions of the input data payload, an optical transmitter for transmitting each of the replicated versions of the data payload over a corresponding one of the plurality of interconnecting links, a detector for detecting each of the replicated versions of the data payload arriving at the output node as propagated over the interconnecting links, and a selector for selecting one of the replicated versions of the data payload as representative of the data payload originated by the source.

* * * * *